US009420001B2

(12) United States Patent
Lehtovirta et al.

(10) Patent No.: US 9,420,001 B2
(45) Date of Patent: Aug. 16, 2016

(54) SECURING DATA COMMUNICATIONS IN A COMMUNICATIONS NETWORK

(71) Applicant: Telefonaktiebolaget L M Ericsson (publ), Stockholm (SE)

(72) Inventors: Vesa Lehtovirta, Espoo (FI); Peter Hedman, Helsingborg (SE); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 100 days.

(21) Appl. No.: 14/354,615

(22) PCT Filed: Oct. 30, 2012

(86) PCT No.: PCT/EP2012/071508
§ 371 (c)(1),
(2) Date: Apr. 28, 2014

(87) PCT Pub. No.: WO2013/064509
PCT Pub. Date: May 10, 2013

(65) Prior Publication Data
US 2014/0304777 A1    Oct. 9, 2014

Related U.S. Application Data

(60) Provisional application No. 61/553,317, filed on Oct. 31, 2011.

(51) Int. Cl.
*G06F 7/04* (2006.01)
*G06F 15/16* (2006.01)
(Continued)

(52) U.S. Cl.
CPC ............ *H04L 63/168* (2013.01); *H04L 63/164* (2013.01); *H04L 63/20* (2013.01); *H04W 4/005* (2013.01); *H04W 12/08* (2013.01)

(58) Field of Classification Search
USPC ............................................................. 726/3
See application file for complete search history.

(56) References Cited

U.S. PATENT DOCUMENTS 7,877,506 B2 *   1/2011   Curtis ................. H04L 63/0272
                                                          709/238
8,515,066 B2 *   8/2013   Saito ................. H04L 29/12009
                                                          380/255

(Continued)

OTHER PUBLICATIONS

International Search Report for PCT Application No. PCT/EP2012/071508, mailed Feb. 28, 2013, 3 pages.

(Continued)

*Primary Examiner* — Christopher Revak
*Assistant Examiner* — Vadim Savenkov
(74) *Attorney, Agent, or Firm* — Myers Bigel & Sibley, P.A.

(57) ABSTRACT

A method of securing communications between first node attached to first network and second node attached to second network. At the second node, first and second information is received on whether the respective first and second networks have a secure network layer path to the respective first and second nodes or are known to use a secure network layer path to attached nodes. Third information is received on whether the first network has a secure internal network layer path and, where the first and second networks are different, whether the first network has a secure network layer path to the second network or is known to use a secure network layer path to the second network. The information determines whether the entire path between the first node and the second node is secured at the network layer level, and whether to establish application layer security for communications.

44 Claims, 15 Drawing Sheets

(51) Int. Cl.
*G06F 17/30* (2006.01)
*H04L 29/06* (2006.01)
*H04W 12/08* (2009.01)
*H04W 4/00* (2009.01)

(56) References Cited

U.S. PATENT DOCUMENTS

| | | | | |
|---|---|---|---|---|
| 2007/0192621 | A1* | 8/2007 | Li | H04L 63/0227 |
| | | | | 713/189 |
| 2009/0158416 | A1* | 6/2009 | Statia | H04L 63/164 |
| | | | | 726/12 |
| 2009/0316682 | A1* | 12/2009 | Twitchell, Jr. | H04L 63/12 |
| | | | | 370/351 |
| 2010/0005179 | A1* | 1/2010 | Dickson | H04L 63/30 |
| | | | | 709/228 |
| 2011/0072261 | A1* | 3/2011 | Thomas | H04L 63/0823 |
| | | | | 713/156 |
| 2011/0131414 | A1* | 6/2011 | Cheng | H04L 63/06 |
| | | | | 713/170 |

OTHER PUBLICATIONS

Written Opinion of the International Searching Authority for PCT Application No. PCT/EP2012/071508, mailed Feb. 28, 2013, 6 pages.

3GPP TR 23.888 V1.5.0 (Oct. 2011); 3$^{rd}$ Generation Partnership Project; Technical Specification Group Services and System Aspects; System Improvements for Machine-Type Communications; (Release 11); 3$^{rd}$ Generation Partnership Project; 650 Route des Lucioles—Sophia Antipolis Valbonne—France; 155 pages; (http://www.3gpp.org/ftp/Specs/html-info/23888.htm).

3GPP TS 33.402 V10.1.0 (Sep. 2011); 3$^{rd}$ Generation Partnership Project; Technical Specification Group Services and System Aspects; 3GPP System Architecture Evolution (SAE); Security aspects of non-3GPP accesses (Release 10); 3$^{rd}$ Generation Partnership Project; 650 Route des Lucioles—Sophia Antipolis Valbonne—France; 47 pages; (http://www.3gpp.org/ftp/Specs/html-info/33402.htm).

3GPP TR 33.868 V0.5.0 (Jul. 2011); 3$^{rd}$ Generation Partnership Project; Technical Specification Group Services and System Aspects; Security aspects of Machine-Type Communications; (Release 11); 3$^{rd}$ Generation Partnership Project; 650 Route des Lucioles—Sophia Antipolis Valbonne—France; 29 pages; (http://www.3gpp.org/ftp/Specs/html-info/33868.htm).

3GPP TS 24.312 V10.4.0 (Sep. 2011); 3$^{rd}$ Generation Partnership Project; Technical Specification Group Core Network and Terminals; Access Network Discovery and Selection Function (ANDSF) Management Object (MO) (Release 10); 3$^{rd}$ Generation Partnership Project; 650 Route des Lucioles—Sophia Antipolis Valbonne—France; 156 pages; (http://www.3gpp.org/ftp/Specs/html-info/24312.htm).

3GPP TS 22.368 V11.3.0 (Sep. 2011); 3$^{rd}$ Generation Partnership Project; Technical Specification Group Services and System Aspects; Service requirements for Machine-Type Communications (MTC); Stage 1 (Release 11); 3$^{rd}$ Generation Partnership Project; 650 Route des Lucioles—Sophia Antipolis Valbonne—France; 24 pages.

* cited by examiner

SECURING DATA COMMUNICATIONS IN A COMMUNICATIONS NETWORK

CROSS REFERENCE TO RELATED APPLICATION

This application is a 35 U.S.C. §371 national stage application of PCT International Application No. PCT/EP2012/071508, filed on 30 Oct. 2012, which itself claims the benefit of U.S. provisional Patent Application No. 61/553,317, filed 31 Oct. 2011, the disclosures and contents of both of which are incorporated by reference herein in their entirety. The above-referenced PCT International Application was published in the English language as International Publication No. WO 2013/064509 A1 on 10 May 2013.

TECHNICAL FIELD

The present invention relates to securing data communications in a communications network. The present invention relates particularly, but not exclusively, to securing machine type data communications.

BACKGROUND

Machine-to-machine (M2M) communication refers to the exchange of information between devices substantially without the need for human intervention. Such communication may be facilitated by the data services offered by existing mobile communication networks. By way of an example, a domestic electricity meter may be coupled to a mobile device (with SIM card installed) in order to periodically send electricity meter readings to a central server of an electricity supply company, via a mobile communication network to which the mobile device has access.

The Third Generation Partnership Project (3GPP) is working towards defining an architecture for such machine-to-machine communications; under 3GPP machine-to-machine communication is referred to as Machine Type Communication (MTC). The 3GPP security Working Group WG SA3 is working specifically on security aspects of MTC.

The endpoints of security and corresponding security mechanisms are illustrated in FIG. 1 of the accompanying drawings. A UE 10 is in communication with an MTC Server 20 and MTC Application 30 via a 3GPP network 40. A UE in this context is typically an MTC device which is used for MTC purposes; in FIG. 1 the UE 10 is shown as running an MTC Application 12. The UE 10 is not necessarily a typical mobile phone held by a human user, but the user is typically communicating with the UE/MTC device 10 via the MTC Application 12 and therefore over the 3GPP network. The term UE is used herein for simplicity, and would include, for example and without limitation, mobile telecommunication devices, portable or handheld computing devices and desktop or installed computers.

In FIG. 1, arrows A1, A2 and A3 show possible endpoints of access security between the UE 10 and the 3GPP network 40. In the MTC architecture, these will likely re-use (as far as possible) the currently specified access security mechanisms for 3GPP and non-3GPP accesses.

Arrows B1 and B2 in FIG. 1 show possible endpoints of security between the MTC Server/Application 20/30 and the 3GPP network 40. In 3GPP this is referred to as "External interface security". It is likely that currently-specified NDS/IP (Network Domain Security/Internet Protocol) mechanisms, like IPsec, can be re-used here.

Arrows C1 and C2 in FIG. 1 show possible endpoints of security directly between the UE 10 and the MTC Server/Application 20/30.

Arrows C1 and C2 represent so-called "Secure Connections", with application layer security between the UE 10 and MTC Server/Application 20/30. It is currently specified that the 3GPP operator may assist with key management for the Secure Connection, e.g. with the help of GBA (Generic Bootstrapping Architecture), but otherwise the Secure Connection is assumed to be transparent to the 3GPP network and out of scope for 3GPP to specify. Therefore in principle any security mechanisms can be used for the Secure Connection, including for example mechanisms being developed in ETSI TC M2M.

As described above, the UE 10 and MTC Server/Application 20/30 communicate over the 3GPP network and there can be several layers of security in between. The application layer security provided by the Secure Connection (arrows C1 and C2) is assumed to be independent of the access security (arrows A1/A2/A3) and External interface security (arrows B1/B2).

The present applicant has identified that network- and device-related inefficiencies result from having different types of security in different parts of the system and at different levels as depicted in FIG. 1, and has further appreciated the desirability of providing an architecture which avoids or at least reduces these inefficiencies.

SUMMARY

A method is proposed of securing data communications between a first node attached to a first network and a second node attached to a second network. First information is received at the second node on whether the first network has a secure network layer path to the first node or is known to use a secure network layer path to attached nodes. Second information is received at the second node on whether the second node has a secure network layer path to the second network or is known to use a secure network layer path to the second network. Third information is received at the second node on whether the first network has a secure internal network layer path and, where the first and second networks are different, on whether the first network has a secure network layer path to the second network or is known to use a secure network layer path to the second network. Data are received at the second node from the first node without application layer security, or data are prepared at the second node to be sent to the first node. It is determined at the second node from the first, second and third information whether the entire path between the first node and the second node is secured at the network layer level. If the determination is that the entire path between the first node and the second node is not secured at the network layer level, then: (i) in the case of having prepared data to be sent to the first node, application layer security is established at the second node with the first node, and the prepared data is sent from the second node to the first node using the established application layer security; or (ii) in the case of having received data from the first node without application layer security, the received data is discarded at the second node and application layer security is established at the second node with the first node to enable the data to be re-sent by the first node using the established application layer security. If the determination is that the entire path between the first node and the second node is secured at the network layer level, then: (i) in the case of having prepared data to be sent to the first node, the prepared data is sent from the second node to the first node without application layer security; or (ii) in the case of having received data from the first node without application layer security, the received data is accepted at the second node.

A method is proposed of securing data communications between a first node attached to a first network and a second node attached to a second network. At the first node either first, second and third information are received from the second node or an indication is received from the second node derived from such information. The first information comprises information on whether the first network has a secure network layer path to the first node or is known to use a secure network layer path to attached nodes. The second information comprises information on whether the second node has a secure network layer path to the second network or is known to use a secure network layer path to the second network. The third information comprises information on whether the first network has a secure internal network layer path and, where the first and second networks are different, on whether the first network has a secure network layer path to the second network or is known to use a secure network layer path to the second network. Data are received at the first node from the second node without application layer security, or data are prepared at the first node to be sent to the second node. It is determined at the first node from the received first, second and third information or from the received indication whether the entire path between the first node and the second node is secured at the network layer level. If the determination is that the entire path between the first node and the second node is not secured at the network layer level, then: (i) in the case of having prepared data to be sent to the second node, application layer security is established at the first node with the second node, and the prepared data is sent from the first node to the second node using the established application layer security; or (ii) in the case of having received data from the second node without application layer security, the received data is discarded at the first node and application layer security is established at the first node with the second node to enable the data to be re-sent by the second node using the established application layer security. If the determination is that the entire path between the first node and the second node is secured at the network layer level, then: (i) in the case of having prepared data to be sent to the second node, the prepared data is sent from the first node to the second node without application layer security; or (ii) in the case of having received data from the second node without application layer security, the received data is accepted at the first node.

The first, second and third information may be received by a protocol procedure.

For example, the method may comprise receiving the determination or the first, second and third information from the second node during a registration or re-registration of the first node with the second node.

At least the determining step may be performed at registration or re-registration of the first node with the second node.

The method may comprise receiving the first information from the other node during the registration or re-registration.

The first information may be information on whether the first network has a secure network layer path to the first node.

The method may comprise caching the result of the determining step, and using the cached result when sending or receiving additional data to/from the other node.

The method may comprise performing the determining step for each set or batch of data to be sent to or received from the other node.

The data being sent to or received at the first node may comprise a trigger indication for triggering the first node to establish data communication with the second node.

The first information may comprise a list of networks each of which networks is known to use a secure network layer path to attached nodes. The method may comprise, as part of the determining step, determining whether the first network has a secure network layer path to the first node by determining whether the first network is in the list of the first information.

The second information may comprise a list of nodes each of which nodes is known to use a secure network layer path to the second network. The method may comprise, as part of the determining step, determining whether the second node has a secure network layer path to the second network by determining whether the second node is in the list of the second information.

The third information may comprise a list of networks each of which networks is known to have a secure internal network layer path and each of which networks is, where different to the second network, known to have a secure network layer path to the second network. The method may comprise, as part of the determining step, determining whether the first network has a secure internal network layer path and, where the first and second networks are different, whether the first network has a secure network layer path to the second network by determining whether the first network is in the list of the third information.

The second network may be the same as the first network; this is a non-roaming scenario. Or, the second network may different to the first network; this is a roaming scenario.

The third information may comprise an assumption that the first network has a secure internal network layer path, at least where the second network is the same as the first network. Thus, the third information may be implicit or pre-configured.

The second network may be assumed to have a secure internal network layer path or the method may comprise, as part of the determining step, determining whether the second network has a secure internal network layer path.

The first, second and third information may be received by a configuration procedure.

The configuration procedure at the first node may comprise receiving the first, second and third information at the first node from a core part of the second network in a Non Access Stratum related message, such as an Attach Accept message, a Routing Area Update Accept message, a Location Update Accept message, a Tracking Area Update Accept message, or a Security Mode Command message.

The configuration procedure at the first node may comprise the first node triggering a network server in the second network to send the first, second and third information, the triggering being performed as part of an attach or location update or routing area update or tracking area update or similar procedure, and receiving the first, second and third information from the network server in a push message.

The configuration procedure at the first node may comprise the first node receiving a trigger message from a network server in the second network for retrieving the first, second and third information, the trigger message being received following or as part of an attach or location update or routing area update or tracking area update or similar procedure, and retrieving or pulling the first, second and third information from the network server in response to receipt of the trigger message.

The configuration procedure at the first node may comprise receiving the first, second and third information over a radio access layer at establishment of a connection to a radio access part of the first network.

The configuration procedure at the first node may comprise receiving the first, second and third information from an access network discovery and selection function, or from an Open Mobile Alliance device management server, or from the second node.

The configuration procedure at the first node may comprise physically loading a subscriber identity module containing the first, second and third information into the first node, or receiving a downloadable subscriber identity module from the first or second network.

One or both of the first and second networks may be a mobile communications network, a wireless network or a wireline network.

The second network may be a registered or home network of the first node.

In a roaming scenario in which the first node is mobile and attaches to different first networks as it roams, the first network may be a visited network.

The first and second networks may be 3GPP networks.

The first node may be a User Equipment and the second node may be a server.

The first node may be a server and the second node may be a User Equipment.

The first and second nodes may be User Equipments.

The first and second nodes may be servers.

The second node may be or may comprise a Machine Type Communication Server or Application.

The first node may comprise a Machine Type Communication Application.

The data may be machine type data.

An apparatus is proposed for use in a method of securing data communications between a first node attached to a first network and a second node attached to a second network. The apparatus comprises at the second node a receiver, a controller and a transmitter. The receiver is arranged to receive first information on whether the first network has a secure network layer path to the first node or is known to use a secure network layer path to attached nodes. The receiver is arranged to receive second information on whether the second node has a secure network layer path to the second network or is known to use a secure network layer path to the second network. The receiver is arranged to receive third information on whether the first network has a secure internal network layer path and, where the first and second networks are different, on whether the first network has a secure network layer path to the second network or is known to use a secure network layer path to the second network. The receiver is arranged to receive data from the first node without application layer security, or the controller is arranged to prepare data to be sent to the first node. The controller is arranged to determine from the first, second and third information whether the entire path between the first node and the second node is secured at the network layer level. If the determination is that the entire path between the first node and the second node is not secured at the network layer level, then: (i) in the case of having prepared data to be sent to the first node, the controller is arranged to establish application layer security with the first node, and the transmitter is arranged to send the prepared data to the first node using the established application layer security; or (ii) in the case of having received data from the first node without application layer security, the controller is arranged to discard the received data and to establish application layer security with the first node to enable the data to be re-sent by the first node using the established application layer security. If the determination is that the entire path between the first node and the second node is secured at the network layer level, then: (i) in the case of having prepared data to be sent to the first node, the transmitter is arranged to send the prepared data to the first node without application layer security; or (ii) in the case of having received data from the first node without application layer security, the controller is arranged to accept the received data.

An apparatus is proposed for use in a method of securing data communications between a first node attached to a first network and a second node attached to a second network. The apparatus comprises at the first node a receiver, a controller and a transmitter. The receiver is arranged to receive first, second and third information or to receive an indication from the second node derived from such information. The first information comprises information on whether the first network has a secure network layer path to the first node or is known to use a secure network layer path to attached nodes. The second information comprises information on whether the second node has a secure network layer path to the second network or is known to use a secure network layer path to the second network. The third information comprises information on whether the first network has a secure internal network layer path and, where the first and second networks are different, on whether the first network has a secure network layer path to the second network or is known to use a secure network layer path to the second network. The receiver is arranged to receive data from the second node without application layer security, or the controller is arranged to prepare data to be sent to the second node. The controller is arranged to determine from the received first, second and third information or from the received indication whether the entire path between the first node and the second node is secured at the network layer level. If the determination is that the entire path between the first node and the second node is not secured at the network layer level, then: (i) in the case of having prepared data to be sent to the second node, the controller is arranged to establish application layer security with the second node, and the transmitter is arranged to send the prepared data to the second node using the established application layer security; or (ii) in the case of having received data from the second node without application layer security, the controller is arranged to discard the received data and to establish application layer security with the second node to enable the data to be re-sent by the second node using the established application layer security. If the determination is that the entire path between the first node and the second node is secured at the network layer level, then: (i) in the case of having prepared data to be sent to the second node, the transmitter is arranged to send the prepared data to the second node without application layer security; or (ii) in the case of having received data from the second node without application layer security, the controller is arranged to accept the received data.

The controller may be arranged to cache the determination, and to use the cached result when sending or receiving additional data to/from the other node.

The controller may be arranged to perform the determination for each set or batch of data to be sent to or received from the other node.

The first information may comprises a list of networks each of which networks is known to use a secure network layer path to attached nodes. The controller may be arranged, as part of its determination, to determine whether the first network has a secure network layer path to the first node by determining whether the first network is in the list of the first information.

The second information may comprise a list of nodes each of which nodes is known to use a secure network layer path to the second network. The controller may be arranged, as part of its determination, to determine whether the second node has a secure network layer path to the second network by determining whether the second node is in the list of the second information.

The third information may comprise a list of networks each of which networks is known to have a secure internal network layer path and each of which networks is, where different to the second network, known to have a secure network layer path to the second network. The controller may be arranged, as part of its determination, to determine whether the first network has a secure internal network layer path and, where the first and second networks are different, whether the first network has a secure network layer path to the second network by determining whether the first network is in the list of the third information.

The receiver may be arranged to receive the first, second and third information by a configuration procedure.

As part of the configuration procedure at the first node, the receiver may be arranged to receive the first, second and third information at the first node from a core part of the second network in a Non Access Stratum related message, such as an Attach Accept message, a Routing Area Update Accept message, a Location Update Accept message, a Tracking Area Update Accept message, or a Security Mode Command message.

As part of the configuration procedure at the first node, the controller may be arranged to trigger a network server in the second network to send the first, second and third information, the triggering being performed as part of an attach or location update or routing area update or tracking area update or similar procedure, and wherein the receiver is arranged to receive the first, second and third information from the network server in a push message.

As part of the configuration procedure at the first node, the receiver may be arranged to receive a trigger message from a network server in the second network for retrieving the first, second and third information, the trigger message being received following or as part of an attach or location update or routing area update or tracking area update or similar procedure, and wherein the controller is arranged to retrieve or pull the first, second and third information from the network server in response to receipt of the trigger message.

As part of the configuration procedure at the first node, the receiver may be arranged to receive the first, second and third information over a radio access layer at establishment of a connection to a radio access part of the first network.

As part of the configuration procedure at the first node, the receiver may be arranged physically to receive a subscriber identity module containing the first, second and third information, or to receive a downloadable subscriber identity module from the first or second network.

One or both of the first and second networks may be a mobile communications network, a wireless network or a wireline network.

A communications node is proposed that comprises such an apparatus as described above.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

Use of an embodiment of the present invention enables lower usage of resources when application layer security is not applied to application data. Use of an embodiment of the present invention can result in less signalling in the system. Use of an embodiment of the present invention can result in a lower energy consumption for a UE/MTC device, which is particularly beneficial where the UE/MTC device is a portable or mobile device having a restricted battery capacity. It is also possible to manufacture less expensive UEs without any support for application layer security if these UEs would only connect to the network if there is sufficient lower layer security available.

DETAILED DESCRIPTION

As mentioned above with reference to FIG. 1, there are several network- and device-related inefficiencies which result from having different types of security in different parts of the system and at different levels.

In this respect, although having several layers of security on top of one another follows the principles of layered architectures, where different architecture layers are independent of each other, there may be an inefficient or even unnecessary use of resources to set up and use application layer security if the lower layers can already provide secure communication between the endpoints (e.g. the UE 10 and MTC Server/Application 20/30 in FIG. 1) in a hop-by-hop fashion.

However, it is technically very difficult to take advantage of lower-layer security at the application layer level because, at least partly due to the layering principle, the endpoints do not usually know when the lower layers can already provide secure communication; consequently, the endpoints do not usually know when application layer security is unnecessary.

A technique is proposed herein aims to allow data to be sent securely without the need to set up application layer security in a situation where the UE 10 can trust the communication path between the UE 10 and the MTC Server/Application 20/30 to be secured by lower layers.

Figure 2:
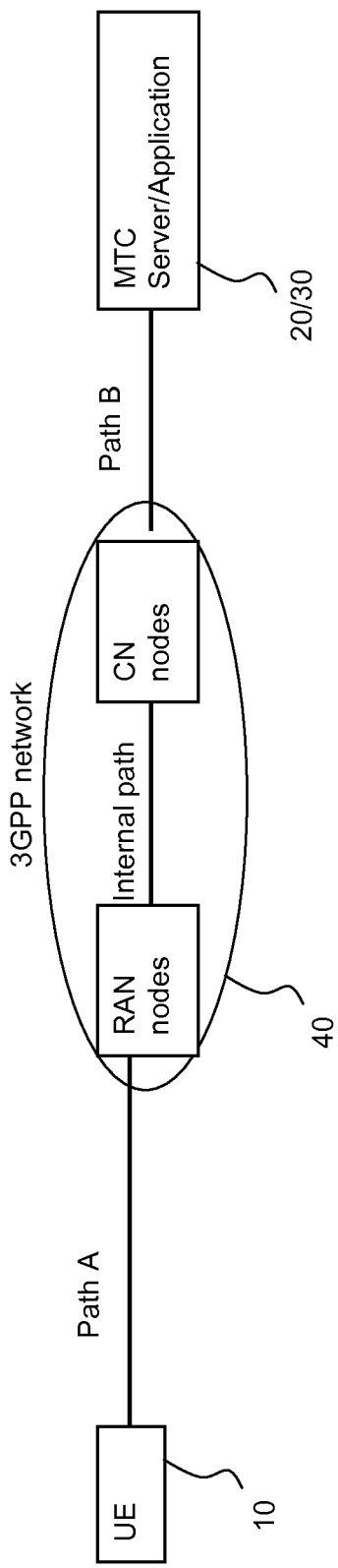
FIG. 2 illustrates hop-by-hop security showing the paths in a non-roaming situation.

The communication path between the UE 10 and MTC Server/Application 20/30 can be considered to comprise three paths as illustrated in FIG. 2, and as summarised below.

A first path ("path A") is that from the UE 10 to the 3GPP network 40.

A second path ("path B") is that from the 3GPP network 40 to the MTC Server/Application 20/30. It is typically assumed that the MTC Server/Application 20/30 is connected to the Home PLMN (HPLMN or Home Public Land Mobile Network) of the UE 10, but this is not always the case.

A third path is the intermediate path within the 3GPP network 40 between paths A and B. It should be noted that the intermediate path as illustrated in FIG. 2 is an internal path and includes paths between Radio Access Network (RAN) nodes and between Core Network (CN) nodes.

If all three of the above paths are secure at the network layer level, and if the network nodes terminating these paths are considered secure and trustworthy as well, then there can be considered to exist a hop-by-hop secure path between the endpoints.

Figure 3:
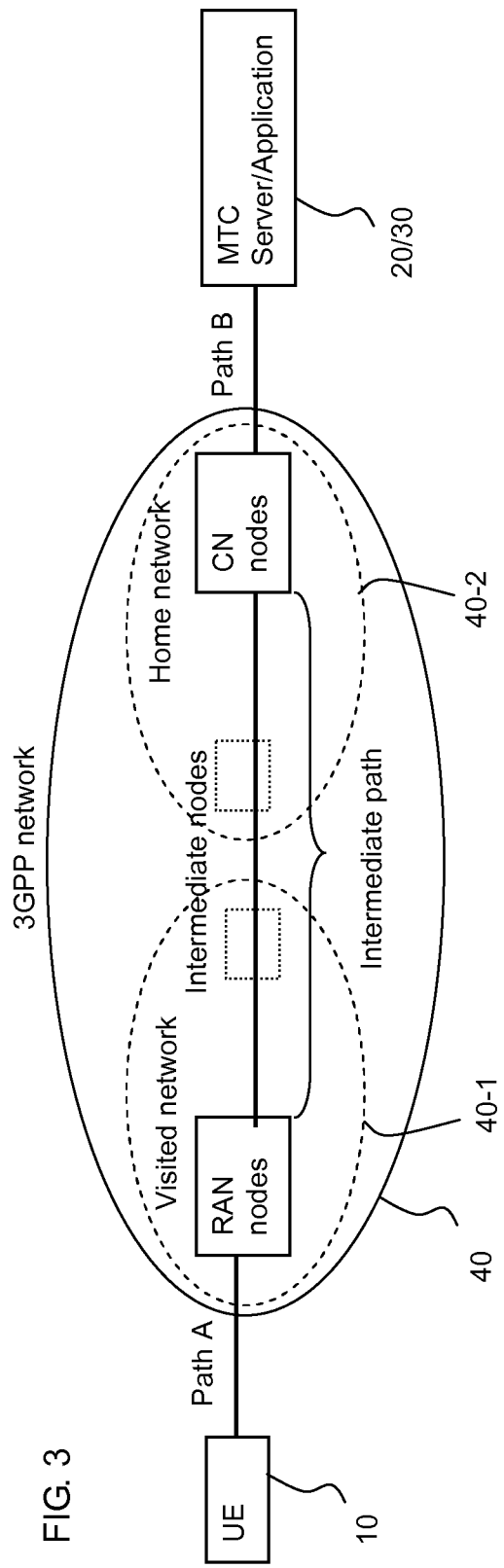
FIG. 3 illustrates hop-by-hop security showing the paths in a roaming situation.

It should be noted that the paths are considered to be logical paths, and they may themselves include intermediate nodes. For example, the intermediate path between the two operators within the 3GPP network domain does not have to consist of one transmission link but can consist of several hops, and these hops may be secured in a hop-by-hop fashion, as is illustrated in FIG. 3. FIG. 3 illustrates a scenario in which the 3GPP network 40 includes both a visited and home network, i.e. a roaming scenario. In this case the intermediate path spans over two operators' networks.

In an embodiment of the present invention, the UE 10 and MTC Server/Application 20/30 determine when sufficient hop-by-hop lower layer security (i.e. lower than application layer level, for example at the network layer level) is available and therefore when application layer security does not need to be established.

This can be achieved by providing "relevant data" to the UE 10 and MTC Server/Application 20/30 concerning the security properties of these three paths.

The relevant data on security properties can be considered to consist of the following information:

First information on whether the 3GPP network 40 to which the UE 10 is connected (identified for example with a PLMN-ID) has a secure path A. An example of a secure path A is where air interface encryption and/or integrity protection is used.

Second information on whether the MTC Server/Application 20/30 (identified, for example, with a Fully Qualified Domain Name or FQDN) and the 3GPP network 40 to which the MTC server 20 is attached, usually the HPLMN (identified for example with a PLMN-ID) have established a secure path B. An example of a secure path B is where External interface security according to TR 33.868 is set up. Traffic within the HPLMN is also regarded as being secure. Since a UE used for MTC purposes would typically communicate with a limited set of MTC Servers/Applications, this information should be limited in length.

Third information on whether the intermediate path between path A and path B is secure. For example, in case of roaming traffic within the visited PLMN (VPLMN) and also traffic between the VPLMN and HPLMN is secure, encryption and/or integrity protection may be used.

The relevant data can be organized into three lists as follows:

A first list (referred to herein as "List 1") contains those PLMNs which are known to use secure path A (for example where air interface encryption and/or integrity protection is used).

A second list (referred to herein as "List 2") contains those MTC Server/Application server(s) (identified e.g. by FQDN) which have established secure path B with the 3GPP network, i.e. typically the UE's HPLMN.

A third list (referred to herein as "List 3") contains those VPLMNs which have a secure internal path and a secure intermediate path to HPLMN. (The HPLMN can be regarded as being secure.)

The above lists explain the logical structure of the information, and it is to be appreciated that the actual information can be organized in different ways.

The security properties of the three paths can be provided to the UE 10 and MTC Server/Application 20/30 in several different ways, and two of these are described herein in detail as first and second embodiments of the present invention, respectively.

In the first embodiment of the present invention, the security properties of the three paths are provided to the UE and MTC Server/Application by a protocol-based method, while in the second embodiment of the present invention the security properties of the three paths are provided to the UE and MTC Server/Application by a configuration-based method.

Before a detailed description of the first and second embodiments with reference to FIGS. 7 to 16, an overview of the first and second embodiments will first be described with reference to FIGS. 4 and 5.

An embodiment of the present invention provides a means of securing data communications between a first node 10 attached to a first network 40-1 and a second node 20/30) attached to a second network 40-2.

With that background in mind, an embodiment of the present invention will now be described with reference to the schematic flowchart of FIG. 4 and the schematic apparatus diagram of FIG. 5. FIG. 4 is for use in illustrating the steps performed by the first node 10 and the second node 20/30, while FIG. 5 is for use in illustrating components of both the first node 10 and the second node 20/30 for performing the steps illustrated in FIG. 4.

The first node 10 and the second node 20/30 each comprise a receiver 110, a controller 120 and a transmitter 130. The receiver 110 comprises components P1, P2, P3, P4r and (at least in the case of the first node 10) P13; these components are arranged respectively to perform steps S1, S2, S3, S4r and S13 of FIG. 4. The controller 120 comprises components P4t, P5, P6t, P6r, P7r and P8r arranged to perform steps S4t, S5, S6*t*, S6*r*, S7*r* and S8*r* respectively of FIG. 4. The transmitter 130 comprises components P7*t* and P8*t* arranged to perform steps S7*t* and S8*t* respectively of FIG. 4. These components can be considered either to be logical or physical components, or a combination of these.

The steps performed at the second node 20/30 (equivalent to the MTC Server/Application 20/30 of FIGS. 1 to 3) will be described first.

In step S1, first information I1 is received at the receiver component P1. The first information I1 specifies whether the first network 40-1 has a secure network layer path to the first node 10 or is known to use a secure network layer path to attached nodes.

In step S2, second information I2 is received at the receiver component P2. The second information I2 specifies whether the second node 20/30 has a secure network layer path to the second network 40-2 or is known to use a secure network layer path to the second network 40-2.

In step S3, third information I3 is received at the receiver component P3. The third information I3 specifies whether the first network 40-1 has a secure internal network layer path and, where the first and second networks 40-1, 40-2 are different, on whether the first network 40-1 has a secure network layer path to the second network 40-2 or is known to use a secure network layer path to the second network 40-2.

Figure 4:
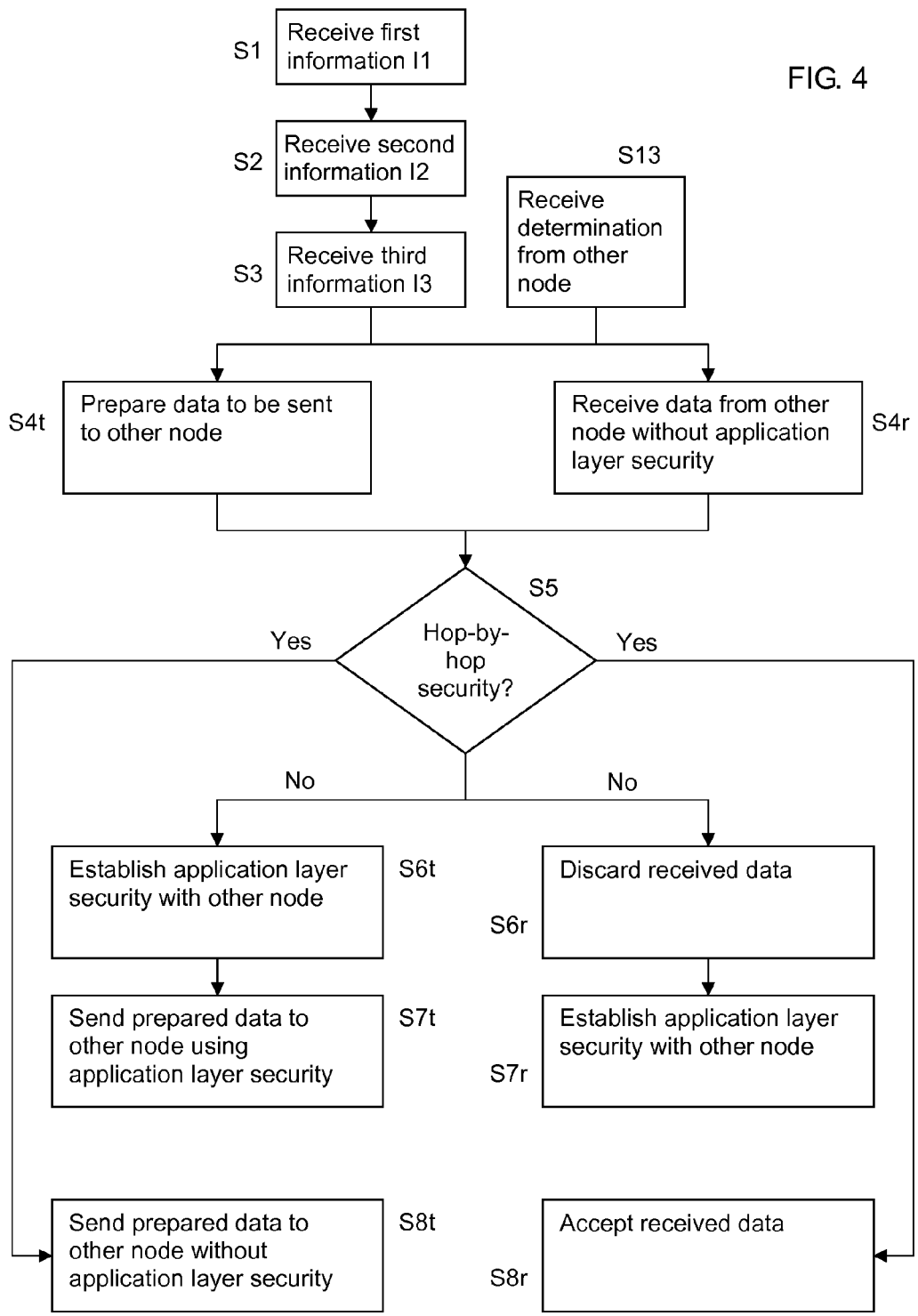
FIG. 4 is a schematic flow chart illustrating a method performed by first and second nodes (UE and MTC Server/Application) in an embodiment of the present invention.
Figure 5:
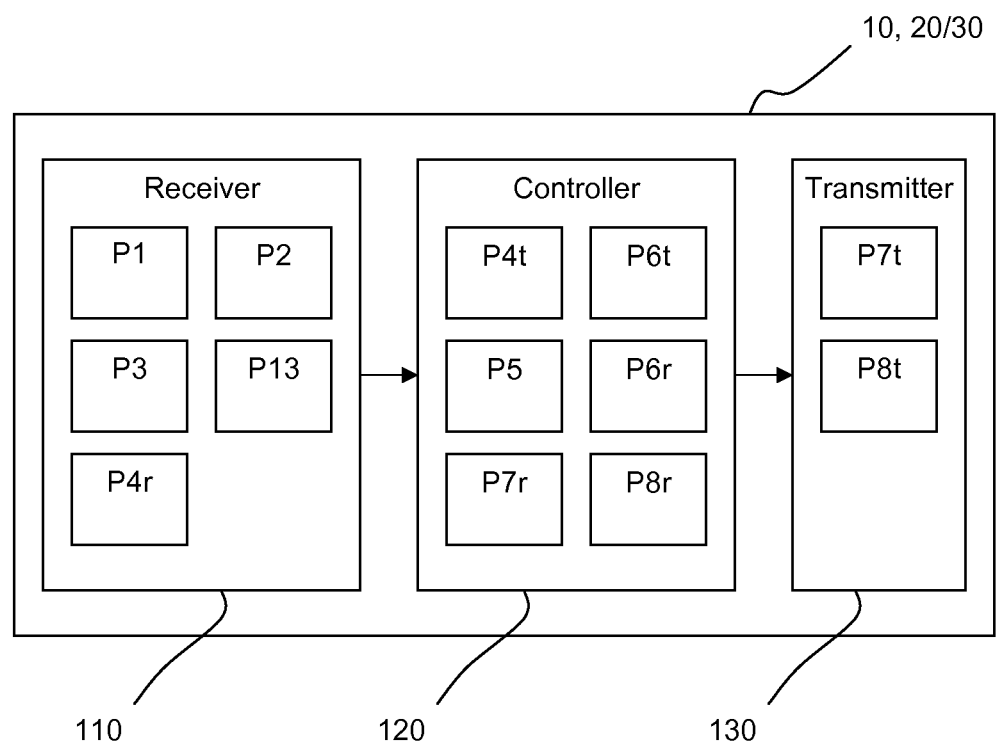
FIG. 5 is a schematic block diagram illustrating apparatus for performing a method embodying the present invention.

A roaming case is where the first network 40-1 is different to the second network 40-2, while a non-roaming case is where the first network 40-1 is the same as the second network 40-2; the description with reference to FIGS. 4 and 5 covers both roaming and non-roaming cases. In a roaming case, the second network 40-2 would be a registered or home network of the first node 10 and the first network 40-1 would be a visited network. In a non-roaming case, the first network 40-1 and the second network 40-2 are one and the same: the registered or home network of the first node 10.

In step S4*t*, the controller component P4*t* is arranged to prepare data for sending to the first node 10.

In step S5, the controller component P5 is arranged to determine from the first, second and third information I1, I2, I3 whether the entire path between the first node 10 and the second node 20/30 is secured at the network layer level.

If the determination from step S5 is that the entire path between the first node 10 and the second node 20/30 is not secured at the network layer level, then in step S6*t* the controller component P6*t* arranges for application layer security to be established with the first node 10, and in step S7*t* the prepared data is sent by the transmitter component P7*t* to the first node 10 using the established application layer security.

On the other hand, if the determination from step S5 is that the entire path between the first node 10 and the second node 20/30 is secured at the network layer level, then in step S8*t* the prepared data is sent by the transmitter component P8*t* to the first node 10 without application layer security.

Returning to step S4*t* described above, as an alternative to the sequence of steps described above from S4*t* onwards, in step S4*r* data is received at the receiver component P4*r* from the first node 10 without application layer security. This alternative is presented on the right-hand side of FIG. 4 (steps S4*r*, S6*r*, S7*r* and S8*r*).

In step S5, the controller component P5 determines from the first, second and third information I1, I2, I3 whether the entire path between the first node 10 and the second node 20/30 is secured at the network layer level.

If the determination from step S5 is that the entire path between the first node 10 and the second node 20/30 is not secured at the network layer level, then in step S6*r* the controller component P6*r* arranges for the received data to be discarded. In step S7*r* the controller component P7*r* arranges for application layer security to be established with the first node 10 to enable the data to be re-sent by the first node 10 using the established application layer security.

On the other hand, if the determination from step S5 is that the entire path between the first node 10 and the second node 20/30 is secured at the network layer level, then in step S8*r* the controller component P8*r* is arranged to accept the received data.

The steps performed at the first node 10 (equivalent to the UE 10 of FIGS. 1 to 3) will now be described.

In steps S1, S2 and S3, first, second and third information I1, I2, I3 is received respectively at the receiver components P1, P2 and P3. Alternatively, an indication derived from such information is received in step S13 at the receiver component P13 from the second node 20/30. The first information I1 comprises information on whether the first network 40-1 has a secure network layer path to the first node 10 or is known to use a secure network layer path to attached nodes. The second information I2 comprises information on whether the second node 20/30 has a secure network layer path to the second network 40-2 or is known to use a secure network layer path to the second network 40-2. The third information I3 comprises information on whether the first network 40-1 has a secure internal network layer path and, where the first and second networks 40-1, 40-2 are different, on whether the first network 40-1 has a secure network layer path to the second network 40-2 or is known to use a secure network layer path to the second network 40-2. As mentioned above, a roaming case is where the first network 40-1 is different to the second network 40-2, while a non-roaming case is where the first network 40-1 is the same as the second network 40-2.

In step S4*t*, the controller component P4*t* is arranged to prepare data for sending to the second node 20/30.

In step S5, the controller component P5 is arranged to determine from the first, second and third information I1, I2, I3 (received in steps S1, S2 and S3) or from the indication (received in step S13) whether the entire path between the first node 10 and the second node 20/30 is secured at the network layer level.

If the determination from step S5 is that the entire path between the first node 10 and the second node 20/30 is not secured at the network layer level, then in step S6*t* the controller component P6*t* arranges for application layer security to be established with the second node 20/30, and in step S7*t* the prepared data is sent by the transmitter component P7*t* to the second node 20/30 using the established application layer security.

On the other hand, if the determination from step S5 is that the entire path between the first node 10 and the second node 20/30 is secured at the network layer level, then in step S8*t* the prepared data is sent by the transmitter component P8*t* to the second node 20/30 without application layer security.

Returning to step S4*t* described above, as an alternative to the sequence of steps described above from S4*t* onwards, in step S4*r* data is received at the receiver component P4*r* from the second node 20/30 without application layer security.

In step S5, the controller component P5 determines from the first, second and third information I1, I2, I3 (received in steps S1, S2 and S3) or from the indication (received in step S13) whether the entire path between the first node 10 and the second node 20/30 is secured at the network layer level.

If the determination from step S5 is that the entire path between the first node 10 and the second node 20/30 is not secured at the network layer level, then in step S6*r* the controller component P6*r* arranges for the received data to be discarded. In step S7*r* the controller component P7*r* arranges for application layer security to be established with the second node 20/30 to enable the data to be re-sent by the 20/30 node 10 using the established application layer security.

On the other hand, if the determination from step S5 is that the entire path between the first node 10 and the second node 20/30 is secured at the network layer level, then in step S8r the controller component P8r is arranged to accept the received data.

It will be appreciated that the first node 10 may be configured to perform steps S5 onwards only in the case of having data prepared for sending to the second node 20/30 (step S4t), or only in the case of having received unsecured data from the second node 20/30 (step S4r), or it may be configured to perform steps S5 onwards in both of these cases. Likewise, the second node 20/30 may be configured to perform steps S5 onwards only in the case of having data prepared for sending to the first node 10 (step S4t), or only in the case of having received unsecured data from the first node 10 (step S4r), or it may be configured to perform steps S5 onwards in both of these cases.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. Any appended claims now or in future are to be interpreted as covering an operating program by itself, or as a record on a carrier, or as a signal, or in any other form.

Figure 6:
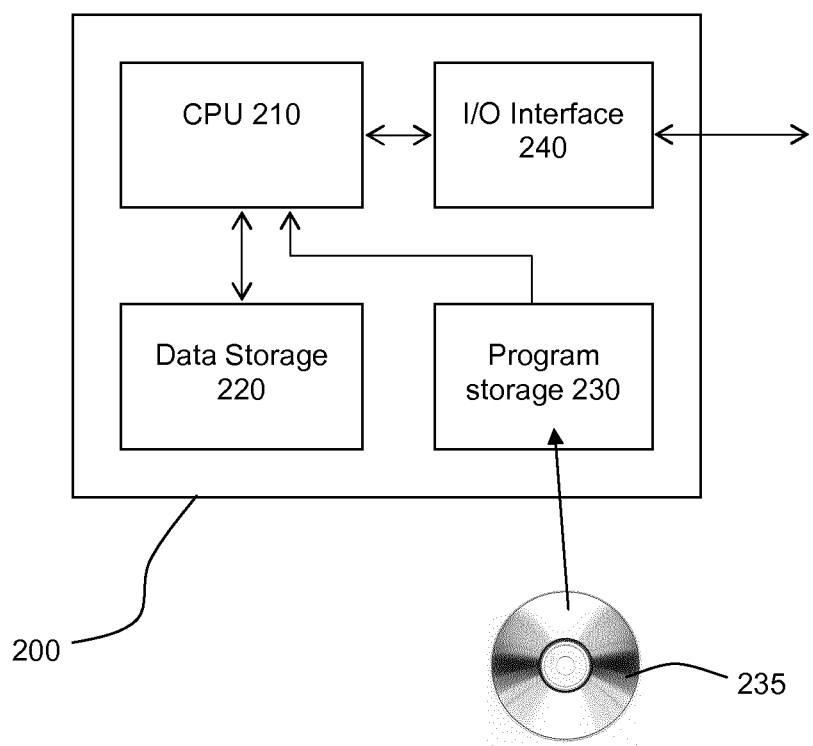
FIG. 6 is a schematic illustration of a node in which a method embodying the present invention can be implemented.

FIG. 6 is a schematic illustration of a node 200 in which a method embodying the present invention can be implemented. A computer program for controlling the node 200 to carry out a method embodying the present invention is stored in a program storage 230. A computer-readable storage medium containing the computer program, such as a CD-ROM 235, may be used to load the computer program into the program storage 230. Data used during the performance of a method embodying the present invention is stored in a data storage 220. During performance of a method embodying the present invention, program steps are fetched from the program storage 230 and executed by a Central Processing Unit (CPU) 210, retrieving data as required from the data storage 220. Output information resulting from performance of a method embodying the present invention can be stored back in the data storage 220, or sent to an Input/Output (I/O) interface 240, which may comprise a transmitter for transmitting data to other nodes, as required. Likewise, the Input/Output (I/O) interface 240 may comprise a receiver for receiving data from other nodes, for example for use by the CPU 210.

A more detailed overview of the first and second embodiments will now be provided, before a more detailed description of the first and second embodiments with reference to FIGS. 7 to 16.

In the first embodiment of the present invention, where the UE 10 is initiating the communication, the UE 10 first registers in the 3GPP access network and determines the registered PLMN and whether 3GPP access security is enabled. The technique is also applicable to a non-3GPP access to EPC setting where the UE connects to a PLMN (HPLMN or VPLMN) as well but via so called trusted or untrusted non-3GPP access network (see TR 33.402 at http://www.3gpp.org/ftp/Specs/html-info/33.402.htm) instead of 3GPP radio access. For simplicity only 3GPP access security is described here.

The UE 10 then initiates application layer communication with the MTC Server/Application 20/30 and provides in a protected message (security credentials for this will have already been set up, for example pre-provisioned or at some initial application layer registration) either information concerning whether access security is enabled on the local link the UE 10 sees (e.g. the 3GPP access), or information concerning which PLMN the UE 10 is registered to, or both. Additional parameters might also be communicated at this time, for example what type of security is used on the local link. Authentication may be performed as well.

The MTC Server/Application 20/30 then decides whether security needs to be set up for data communication between the UE 10 and the MTC Server/Application 20/30 based on the information received from the UE 10 and the previously-mentioned lists which will have been configured in the MTC Server/Application 20/30. The MTC Server/Application 20/30 could be configured with the lists (relevant data) at any time and in any manner, e.g. by the MTC user, the 3GPP operator or some other entity.

In the second embodiment, relevant data is provisioned, followed by use of the relevant data to determine if application layer security is required.

Relevant data can be provisioned (provided) to the UE 10 when the UE is configured online or off-line. Alternatively, the UE 10 could fetch the data from a configuration server periodically or when intending to set up a connection to a new network. The MTC Server/Application 20/30 could be configured with the relevant data any time, or the MTC Server/Application 20/30 can receive the relevant data from the 3GPP network to which it is connected. In the second embodiment, therefore, the UE 10 and the MTC Server/Application 20/30 receive the relevant data by way of a configuration procedure, rather than by way of a protocol procedure as in the first embodiment.

Figure 1:
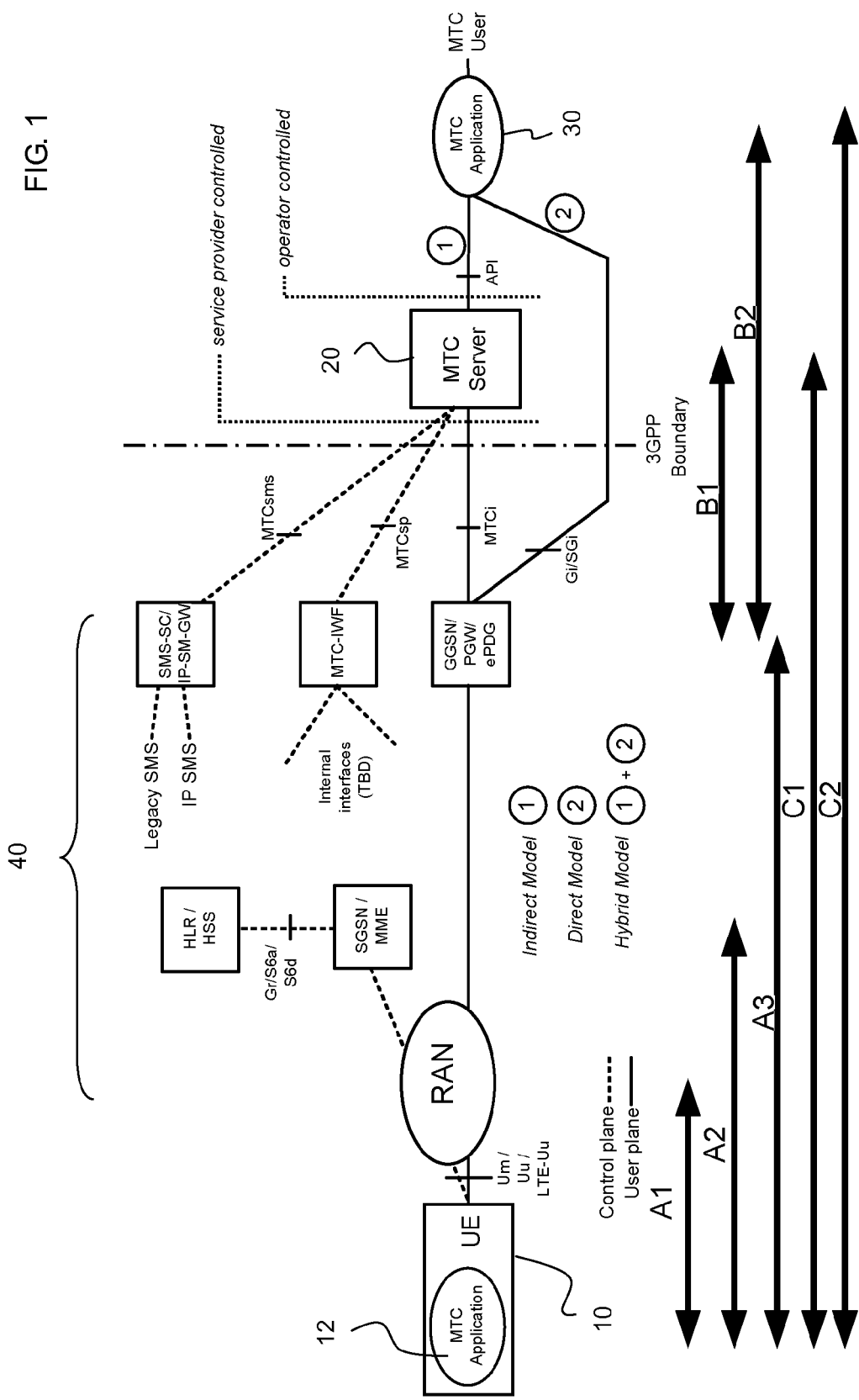
FIG. 1, discussed hereinbefore, illustrates a system architecture for MTC from 3GPP.

Regarding use of the relevant data to determine if application layer security is needed, when the UE 10 or MTC Server/Application 20/30 needs to initiate communication with each other, or if they receive a communication request from each other, they independently determine if secure path A and B and a secure 3GPP network intermediate path are available (refer to FIGS. 1 to 3 and associated description).

For determination on the UE side, the UE 10 checks the ID (PLMN-ID) of the PLMN to which the UE is connected, e.g. from the radio level information. The UE 10 checks if the PLMN-ID is found in List 1. The UE 10 can also locally check if air interface protection is in use. The UE 10 checks if the FQDN of the MTC Server/Application 20/30 (i.e. HPLMN-ID<>FQDN pair) is found in List 2. The UE 10 checks if the PLMN-ID to which the UE is connected is found in list 3. If all checks are successful, then it is determined that there is no need to establish application layer security. If any of the checks fails, it is determined that application layer security needs to be established.

For determination on the MTC server/Application side, the MTC server/Application 20/30 checks the ID of the PLMN (the PLMN-ID) to which the UE 10 is connected. The MTC Server/Application 20/30 may request or get this information from the 3GPP network (e.g. from the MTC interworking Function, MTC-IWF, or from the Home Subscriber Server, HSS), or it may be pre-configured to the MTC Server/Application 20/30 in some cases if the UE 10 is known to be stationary. The MTC Server/Application 20/30 checks if the PLMN-ID is found in List 1. The MTC server/Application may also request or get this information from the 3GPP network (e.g. from the MTC-IWF or from the HSS), or it may be pre-configured to the MTC Server/Application 20/30. The MTC Server/Application 20/30 checks if the FQDN of the MTC Server/Application 20/30 (i.e. HPLMN-ID< >FQDN pair) is found in List 2. The MTC Server/Application 20/30 may also locally check if security is used between the MTC server/Application and the HPLMN. The MTC Server/Application 20/30 checks if the PLMN-ID to which the UE 10 is connected is found in List 3. The MTC Server/Application 20/30 may also request or get this information from the 3GPP network (e.g. from the MTC-IWF or from the HSS).

If all checks are successful, then it is determined that there is no need to establish application layer security. If any of the checks fails, it is determined that application layer security needs to be established.

The above-mentioned first embodiment will now be described in more detail with reference to FIGS. 7 to 10. The first embodiment fits within the overall framework described above with reference to FIGS. 4 and 5.

Figure 9:
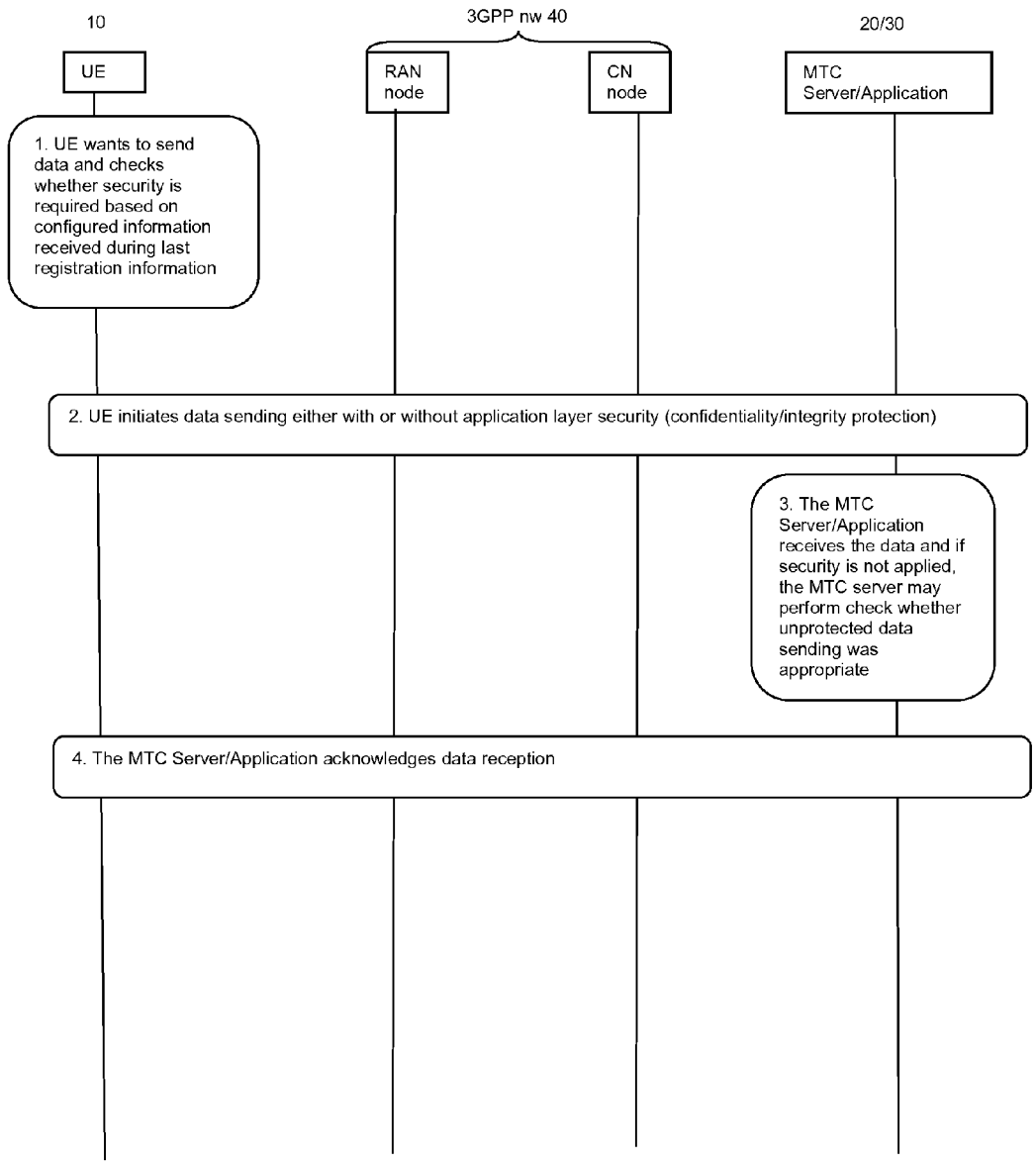
FIG. 9 illustrates, in the first embodiment of the present invention, the sending of data from the UE to the MTC Server/Application after the initial registration.
Figure 10:
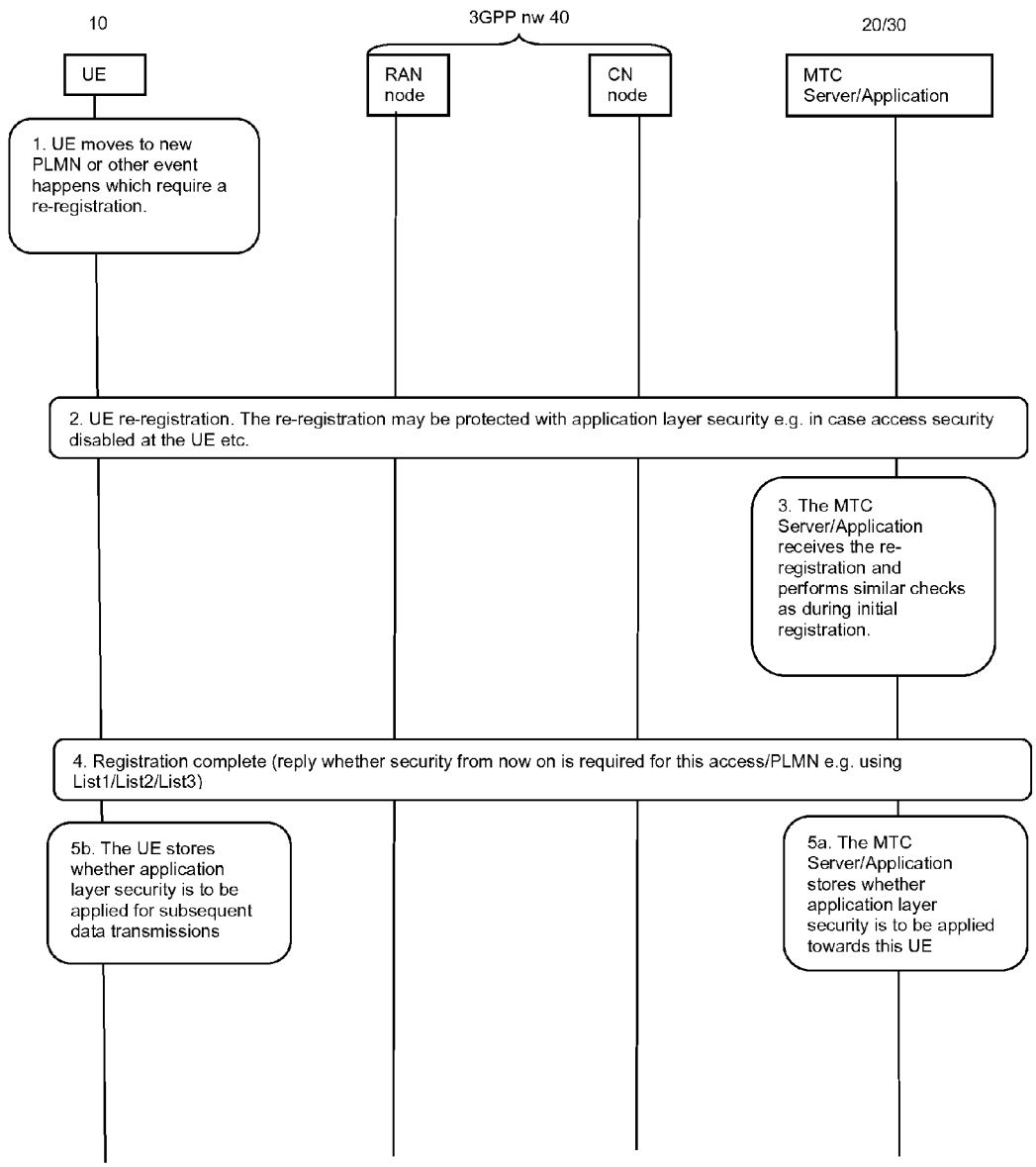
FIG. 10 illustrates, in the first embodiment of the present invention, the sending of a re-registration from the UE to the MTC Server/Application.

The following three phases of the first embodiment are described in turn: a first phase involving UE registration in the MTC Server/Application (see FIG. 7); a second phase involving the sending of data after initial registration (see FIGS. 8 and 9); and a third phase involving re-registration (see FIG. 10).

In the first phase mentioned above, it is assumed in this example that the UE-initiated initial application registration at application layer is protected. In this example, the UE 10 initially does not have available to it the relevant data described above, i.e. List 1, List 2 and List 3. The MTC Server/Application 20/30 may have access to the relevant data, i.e. List 1, List 2 and List 3, or access to something similar.

The first time the UE 10 wishes to register in the MTC Server/Application 20/30 in order to take the application into use in the UE 10, the UE 10 establishes an application layer session to the MTC Server/Application 20/30. In this registration phase, the UE 10 and MTC Server/Application 20/30 mutually authenticate (using credentials which are out of scope of this disclosure) and negotiate between them as to whether end-to-end application layer security needs to be established depending on the security provided by the lower layers (this could be seen as the network providing the UE 10 with the relevant data, but those only contain the entry valid for current access used); the negotiation is done securely. Or the MTC Server/Application 20/30 can, during the application registration phase, provide the relevant data (e.g. List 1, List 2 and List 3) setting out which access networks are to be trusted when access layer security is enabled.

The following steps are described with reference to FIG. 7.

Figure 7:
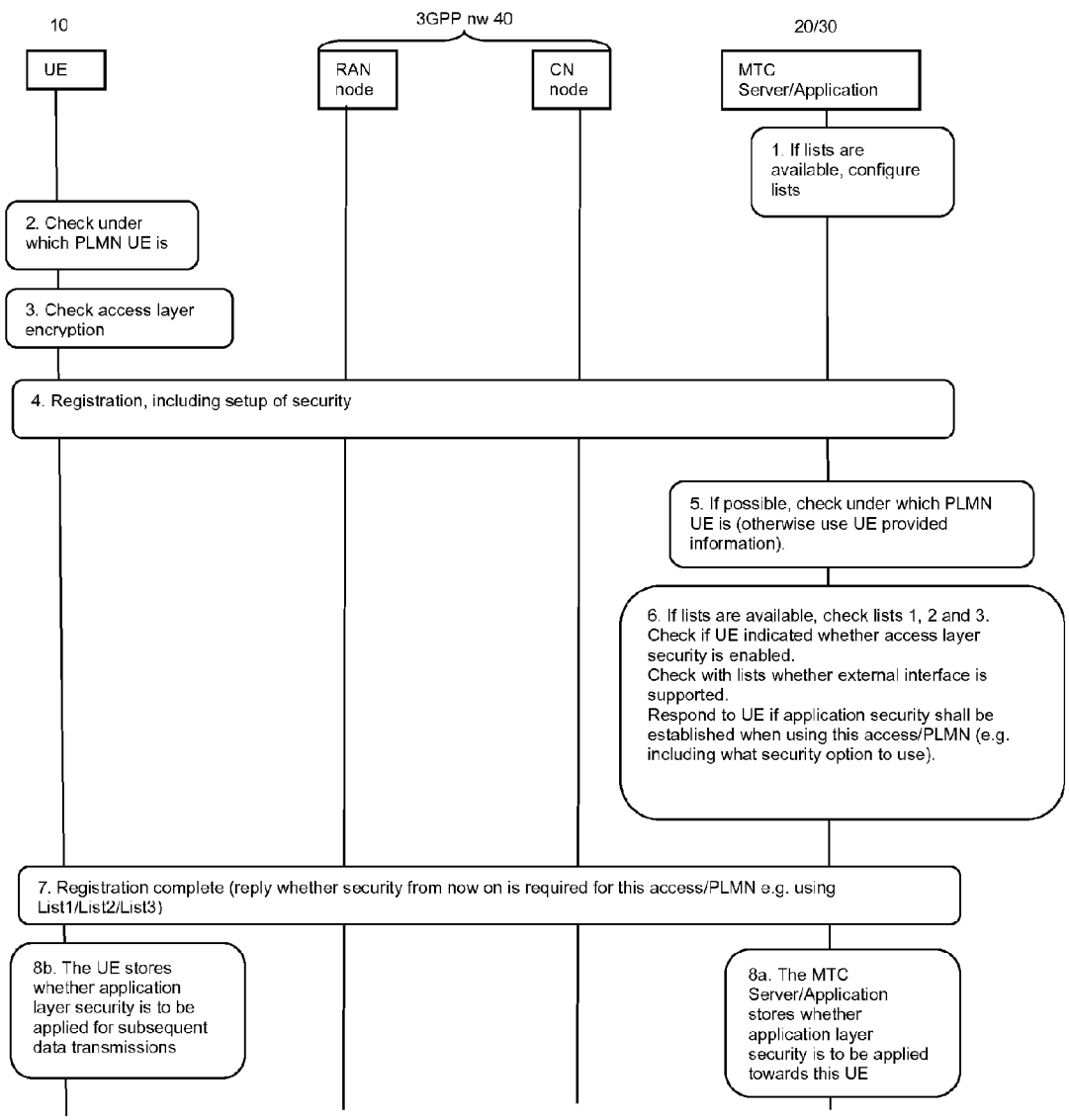
FIG. 7 illustrates, in a first embodiment of the present invention, the sending of a registration from the UE to the MTC Server/Application.

In step 1 of FIG. 7, the MTC Server/Application 20/30 may be configured with the relevant data (Lists 1, 2 and 3). The MTC Server/Application 20/30 is identified with a FQDN. The configuration can be done by an entity in the home PLMN of the UE 10, or by a third party.

In step 2 of FIG. 7, the UE 10 wishes to send a registration message to the MTC Server/Application 20/30 in order to send and receive data to/from the MTC Server/Application 20/30. The UE 10 checks under which PLMN the UE 10 is attached, e.g. from the cell information.

In step 3 of FIG. 7, the UE 10 determines whether or not access layer security (for example encryption and/or integrity protection) is enabled at the access layer in this PLMN.

It is to be noted that the checking or negotiation with the MTC Server/Application 20/30 by the UE 10 to determine whether or not application layer security is required may not be needed every time data is sent by UE 10, but is always needed at least once, typically at registration. The determination as to whether application layer security is needed could be cached and it could be associated to a data session, e.g. an RTP (Real-time Transport Protocol) session.

In step 4 of FIG. 7, the UE 10 establishes an application layer session with the MTC Server/Application 20/30 and initiates communication with the MTC Server/Application 20/30 in order to register and in order to negotiate with the MTC Server/Application 20/30 as to whether or not application layer security is to be used.

It is to be noted that in this negotiation between the UE 10 and the MTC Server/Application 20/30, the UE 10 could send the actual data to the MTC Server/Application 20/30, but the UE 10 could also wait to send the actual data until after the negotiation has taken place.

The UE 10 could provide one or more of the following pieces of information to the MTC Server/Application 20/30 as part of the negotiation:
(a) a UE-ID. This is some form of private identity such as an International Mobile Subscriber Identity (IMSI) or IP Multimedia Private Identity (IMPI);
(b) the current PLMN-ID of the UE 10;
(c) an indication as to whether or not access layer security (e.g. encryption and/or integrity) is enabled in the access network;
(d) supported application layer security options in the UE 10 for this MTC Server/Application 20/30. This information could be pre-configured in the Mobile Equipment (ME) by e.g. OMA (Open Mobile Alliance) Device Management (OMA DM), or e.g. in the Universal Integrated Circuit Card (UICC);
(e) any other information required by the MTC Server/Application 20/30 from the UE 10 may be sent as well in this negotiation.

Application layer security should be setup for the initial registration in order to allow that the negotiation will be secure.

In step 5 of FIG. 7, the MTC Server/Application 20/30 checks the PLMN-ID in which the UE 10 is currently registered. This could be done by checking the received message from the UE 10 or by checking with the 3GPP network (e.g. using 3GPP monitor functionality which enables the MTC Server/Application 20/30 to subscribe to 3GPP events related to the UE 10). The MTC Server/Application 20/30 could also double check that the PLMN-ID provided by UE 10 matches the information received from the 3GPP network. If monitor functionality is not available, just the UE-provided information can be used (possibly checking the MTC Server/Application 20/30 configured information as to whether the UE 10 is allowed to roam to the PLMN provided by the UE 10).

In step 6 of FIG. 7, the MTC Server/Application 20/30 determines whether application layer security is needed. In doing so, the MTC Server/Application 20/30 checks if the UE 10 has indicated that access layer security is enabled, and may also check if the PLMN-ID is found in List 1. It also checks if the relevant PLMN-ID< >FQDN pair is found in List 2.

If, based on the above checks, the MTC Server/Application 20/30 determines that application layer security is not needed, in step 7 of FIG. 7 it indicates to the UE 10 that no application layer security is needed from now on and therefore that the UE 10 can send data without application layer security mechanisms.

If access layer encryption is disabled in the UE 10, the UE 10 could be configured so that it does not accept the use of no application layer security. However, there could also be MTC Server/Applications that do not require end-to-end security.

That could be preconfigured in the UE 10 for this specific MTC Server/Application 20/30.

If the MTC Server/Application 20/30 determines that application layer security is needed, it indicates to the UE 10 to use application layer security. If the MTC Server/Application 20/30 would subsequently receive data unprotected from this UE 10, the MTC Server/Application 20/30 discards the data received from the UE 10; this could be due to an attack.

In steps 8a and 8b of FIG. 7, the MTC Server/Application 20/30 and the UE 10 respectively store the information whether application layer security is to be applied in subsequent communications e.g. sending data.

In the second phase mentioned above, it is assumed that the initial application registration at application layer has been performed (FIG. 7).

In the second phase, either the UE 10 or the MTC Server/Application 20/30 wants to send data to the peer. (The MTC Server/Application 20/30 often first initiates a trigger message to ensure the UE 10 is available for IP connectivity.) Whether or not application layer security is to be applied depends on the information setup during last registration (FIG. 7).

Figure 8:
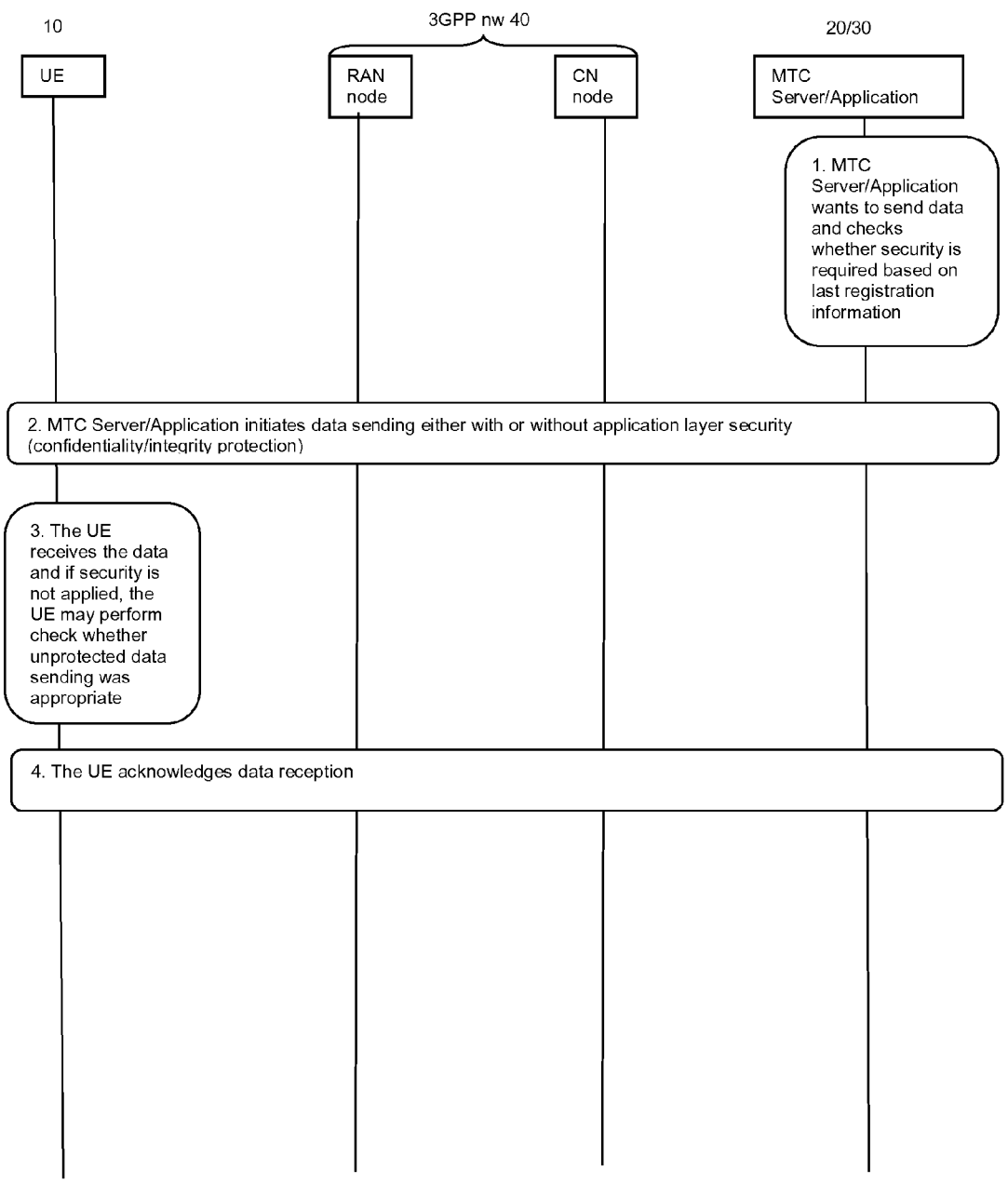
FIG. 8 illustrates, in the first embodiment of the present invention, the sending of data from the MTC Server/Application to the UE after the initial registration.

The steps performed in the second phase are illustrated in FIGS. 8 and 9. FIG. 8 illustrates the sending of data from the MTC Server/Application 20/30 to the UE 10 after the initial registration, while FIG. 9 illustrates the sending of data from the UE 10 to the MTC Server/Application 20/30 after the initial registration.

In step 1 of FIG. 8, the MTC Server/Application 20/30 wishes to send data to the UE 10, and checks whether security is required based on last registration information (see FIG. 7).

In step 2 of FIG. 8, the MTC Server/Application 20/30 initiates data sending either with or without application layer security (confidentiality/integrity protection), depending on the determination from step 1 of FIG. 8.

In step 3 of FIG. 8, the UE 10 receives the data and if security has not been applied, the UE 10 may perform a check as to whether the sending of unprotected data was appropriate. If not, the UE 10 can choose to discard the received data.

In step 4 of FIG. 8, if the data is accepted, the UE 10 acknowledges receipt of the data.

Turning now to FIG. 9 (the sending of data from the UE 10 to the MTC Server/Application 20/30 after the initial registration), in step 1 of FIG. 9, the UE 10 wishes to send data to the MTC Server/Application 20/30, and checks whether security is required based on last registration information (see FIG. 7).

In step 2 of FIG. 9, the UE 10 initiates data sending either with or without application layer security (confidentiality/integrity protection), depending on the determination from step 1 of FIG. 9.

In step 3 of FIG. 9, the MTC Server/Application 20/30 receives the data and if security has not been applied, the MTC Server/Application 20/30 may perform a check as to whether the sending of unprotected data was appropriate. If not, the MTC Server/Application 20/30 can choose to discard the received data.

In step 4 of FIG. 9, if the data is accepted, the MTC Server/Application 20/30 acknowledges receipt of the data.

In the third phase mentioned above, it is assumed that the initial application registration at application layer has been performed (FIG. 7). the third phase relates to a re-registration procedure. In this respect, in a case where the UE 10 changes to another PLMN, a new access, access security is changed (e.g. from security applied to not applied) or a registration timer expires (for M2M applications the application layer registration timer is assumed to be very long) the UE 10 may initiate a re-registration; this is illustrated in FIG. 10 as step 1. The MTC Server/Application 20/30 may also trigger a re-registration e.g. in a case where Service Level Agreements have changed (not shown in FIG. 10).

If a re-registration is not initiated for some events, then initiating application layer security may be required e.g. access security disabled at the UE 10 and the MTC Server/Application 20/30 initiates a trigger towards the UE 10 (as MTC Server/Application 20/30 wants to send data), then the UE 10 ensures application layer security is enabled for the communication. Similarly for UE-initiated communication; the UE 10 initiates data communication including applying application layer security as e.g. access security been disabled at the UE 10 (or other event meaning the "agreement is not valid anymore"). This option may be suitable to avoid too many re-registrations and therefore limit the signalling load.

Whether a re-registration is to be initiated or not is up to application layer logic.

If re-registration is performed, this proceeds according to the steps in FIG. 10. The procedure is analogous to that performed during registration; that is described above in detail with reference to FIG. 7 and therefore only a brief summary of the steps of FIG. 10 is included here.

In step 1 of FIG. 10, the UE 10 moves to a new PLMN or some other event occurs which requires a re-registration to be performed. Step 2 of FIG. 10 is equivalent to steps 2 to 4 of FIG. 7, i.e. the UE 10 checks under which PLMN the UE 10 is attached, determines whether or not access layer security is enabled at the access layer in this PLMN, establishes an application layer session with the MTC Server/Application 20/30 and initiates communication with the MTC Server/Application 20/30 in order to re-register and in order to negotiate with the MTC Server/Application 20/30 as to whether or not application layer security is to be used. Step 3 of FIG. 10 is equivalent to steps 5 and 6 of FIG. 7, i.e. the MTC Server/Application 20/30 performs checks to determine whether application layer security is needed. Steps 4, 5a and 5b of FIG. 10 are equivalent to steps 7, 8a and 8b of FIG. 7, i.e. the MTC Server/Application 20/30 indicates to the UE 10 whether or not application layer security is needed from now on, with the MTC Server/Application 20/30 and the UE 10 each storing the information as to whether application layer security is to be applied in subsequent communications e.g. sending data.

The above-mentioned second embodiment will now be described in more detail with reference to FIGS. 11 to 16. The second embodiment fits within the overall framework described above with reference to FIGS. 4 and 5.

The following three phases will now be described in turn: a first phase involving triggering the UE 10 from the MTC Server/Application 20/30 (see FIG. 11); a second phase involving the sending of data from the UE 10 to the MTC Server/Application 20/30 (see FIG. 12); and a third phase involving the sending of data from the MTC Server/Application 20/30 to the UE 10 (see FIG. 13).

Referring to the first phase, when the MTC Server/Application 20/30 wishes to communicate with the UE 10, the MTC Server/Application 20/30 "pokes" the UE 10 with some kind of indication. This is called triggering in the 3GPP MTC work. As a result, the UE 10 is triggered to establish a connection to the MTC Server/Application 20/30.

Several different ways to implement triggering are under discussion in 3GPP, but common to them is that the trigger indication should include an identification or address of the MTC Server/Application 20/30 which the UE 10 should contact (or the UE 10 may be pre-provisioned with address of the MTC Server/Application 20/30). The main triggering mechanisms being proposed are triggering via Non Access Stratum (NAS) signalling (e.g. a new information element in an existing NAS message or a new NAS message) and triggering via Short Message Service (SMS). In case the SMS trigger is sent from the network to the MTC device using NAS as a transport, the SMS trigger will also benefit from the integrity protection of NAS signalling in LTE. However, the solution applies equally to a User Plane triggering solution.

Security WG SA3 has identified that the trigger indication should be integrity protected to avoid false triggers being accepted by the UE 10. WG SA3 has further identified that integrity protection only for path A may not be enough since source verification all the way from the trigger indication source, i.e. from MTC Server/Application 20/30, may be needed. In this document is provided a solution for this problem since the UE 10 can trust the path from MTC Server/Application 20/30 to be secured by the lower layers.

Figure 11:
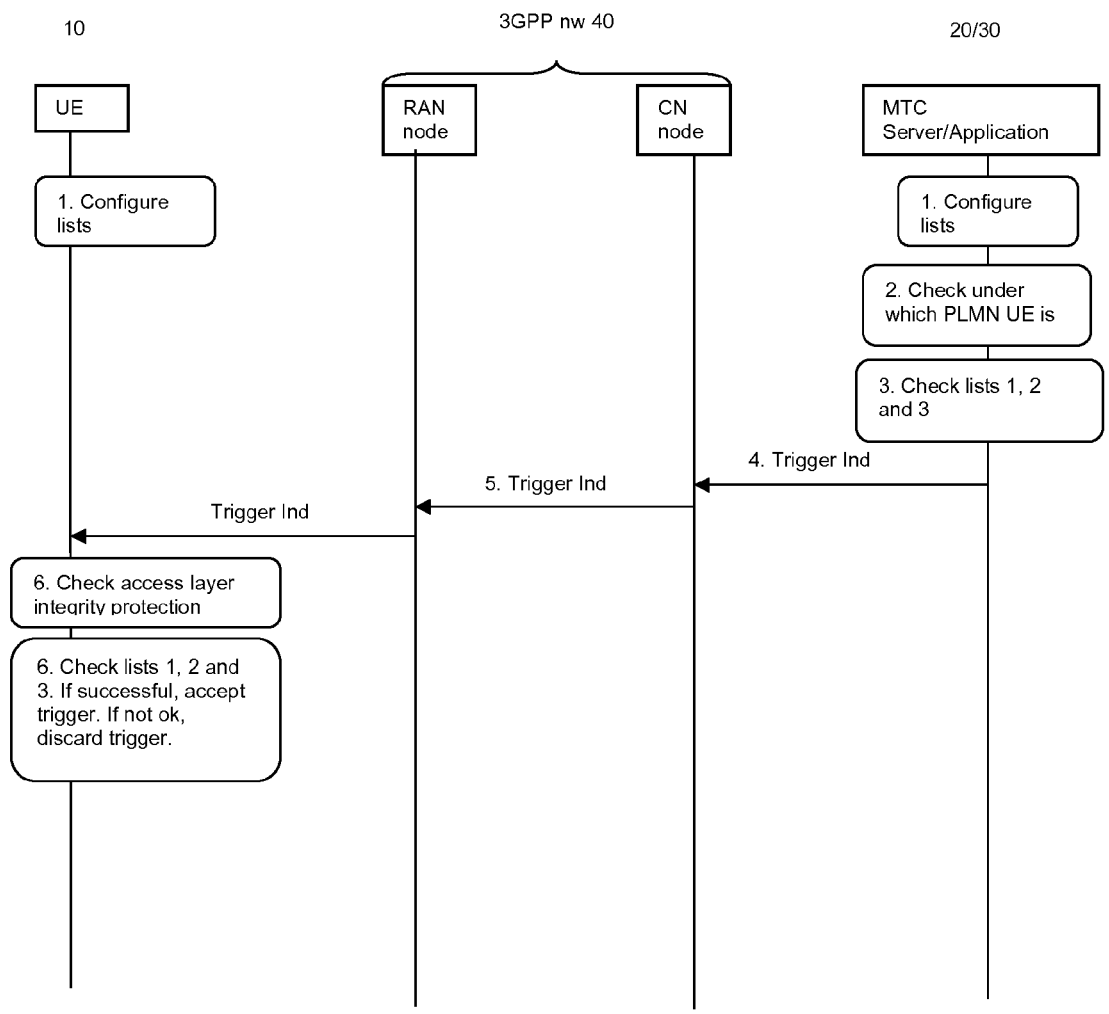
FIG. 11 illustrates, in a second embodiment of the present invention, triggering of the UE from the MTC Server/Application.

FIG. 11 illustrates triggering of UE 10 from the MTC Server/Application 20/30.

In step 1 of FIG. 11, the UE 10 and MTC Server/Application 20/30 are configured with (receive) Lists 1, 2 and 3. The MTC Server/Application 20/30 is identified with e.g. a FQDN. The UE 10 can be configured online or off-line. Or the UE 10 could fetch the data from a configuration server periodically or when intending to set-up a connection to a new network. The MTC Server/Application 20/30 could be configured with the relevant data any time, e.g. by the MTC user, the 3GPP operator or some other entity.

In step 2 of FIG. 11, the MTC Server/Application 20/30 wants to trigger the UE 10. It checks any stored information about the UE 10, e.g. UE 10 might be fixed to a location/PLMN and not able to roam or PLMN-ID might be reported by the UE 10 to the MTC Server/Application 20/30 in case the PLMN-ID changes (e.g. from trustworthy PLMN to non-trustworthy PLMN), or the 3GPP network could report the current PLMN of the UE 10 to the MTC Server/Application 20/30 dynamically via so called monitoring function. In any case, the PLMN-ID could be known at this point.

Assuming that the PLMN-ID is known, in step 3 of FIG. 11 the MTC Server/Application 20/30 determines if application layer security is needed. In doing so, it checks if the relevant PLMN-ID is found in List 1 and if the HPLMN-ID<>FQDN pair is found in List 2, and if the relevant PLMN-ID is found in List 3.

If all checks are successful, in step 4 of FIG. 11 the MTC Server/Application 20/30 can send the trigger indication without applying any end-to-end security. This means that the MTC Server/Application 20/30 can rely on the 3GPP network to securely forward the trigger indication to the UE 10. If the PLMN-ID is not known the MTC Server/Application 20/30 could apply end-to-end integrity protection on the trigger using e.g. pre-provisioned application layer key.

In step 5 of FIG. 11, the trigger indication is forwarded within the 3GPP network.

In step 6 of FIG. 11, the UE 10 receives the trigger indication. The UE 10 determines if it can accept the trigger indication.

First, the UE 10 checks if the trigger indication is integrity protected by access layer security mechanisms, e.g. by LTE NAS or AS security. If not, the UE 10 marks the trigger as not protected by access layer and may look deeper into the trigger to determine if end-to-end protection was applied. If there is access security integrity protection, the UE 10 will check it.

If the access layer integrity check is not successful, the UE 10 discards the trigger.

If it is successful, the UE 10 determines if it can trust the 3GPP network to convey the trigger securely from the MTC Server/Application 20/30. This means, to have a secured interface from the MTC Server/Application 20/30 to the 3GPP network, and the 3GPP network is trusted to ensure that only trigger indications received from authorized MTC Server/Applications will lead to triggering of MTC Devices "belonging" to that MTC Server/Application. In practice the UE 10 checks if the relevant PLMN-ID is found in List 1 and if the relevant PLMN-ID<>FQDN pair is found in List 2, and in case of roaming if the relevant PLMN-ID is found in List 3. If these checks are successful, the UE 10 accepts the trigger indication, and acts accordingly, e.g. it may establish a connection to the MTC Server/Application 20/30. If any of the checks fail, the UE 10 may discard the trigger indication, or it may look deeper into the trigger to determine if end-to-end protection was applied anyway, and e.g. check the end-to-end integrity protection.

Referring now to the second phase mentioned above, when the UE 10 wishes to communicate with the MTC Server/Application 20/30, the UE 10 would normally establish an application layer session to the MTC Server/Application 20/30. This can happen with or without a preceding trigger indication from the MTC Server/Application 20/30. An application layer session may consist of one or more data packets.

In the second phase according to the second embodiment, a way is provided to send data securely without needing to set up application layer security, since the UE 10 can trust the path from the UE 10 to the MTC Server/Application 20/30 to be secured by the lower layers.

Figure 12:
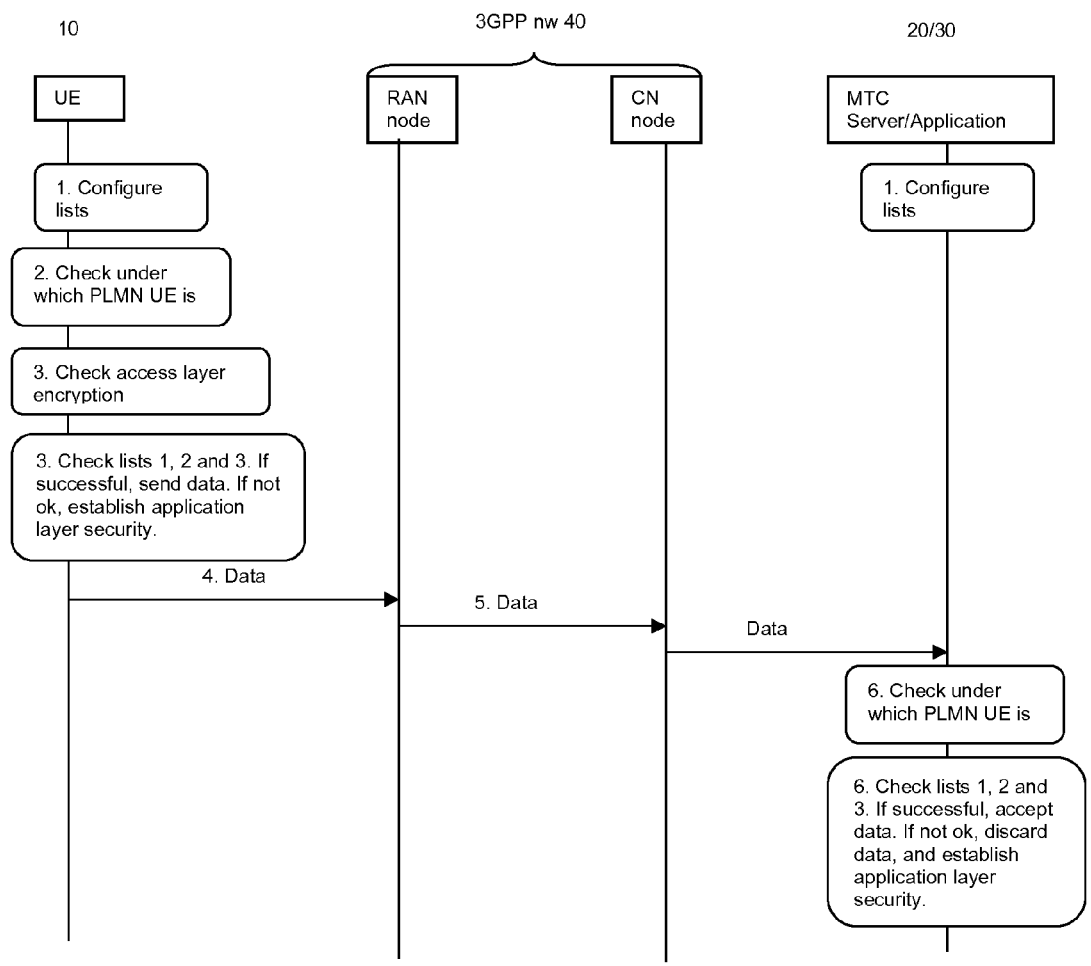
FIG. 12 illustrates, in the second embodiment of the present invention, the sending of data from the UE to the MTC Server/Application.

FIG. 12 illustrates the second phase, involving the sending of data from the UE 10 to the MTC Server/Application 20/30.

In step 1 of FIG. 12, the UE 10 and MTC Server/Application 20/30 are configured with (receive) Lists 1, 2 and 3. The MTC Server/Application 20/30 is identified with a FQDN. The configuration can be done by an entity, e.g. in the UE 10's home PLMN or a third party.

In step 2 of FIG. 12, the UE 10 wants to send data to or start a communication session with the MTC Server/Application 20/30. The UE 10 checks under which PLMN the UE 10 is.

In step 3 of FIG. 12, the UE 10 determines if application layer security is needed. In doing so, the UE 10 determines if security is enabled at the access layer, e.g. by determining if the relevant PLMN-ID (i.e. the ID of the PLMN to which the UE 10 is connected) is found in List 1. In case of roaming, the UE 10 also determines if the relevant PLMN-ID (i.e. the ID of the PLMN to which the UE 10 is connected) is found in List 3 (this determines if the link between VPLMN and HPLMN is secured). The UE 10 also determines if a secure path is set up between the HPLMN and MTC Server/Application 20/30 and the 3GPP network is trustworthy, i.e. whether the relevant PLMN-ID<>FQDN pair is found in List 2.

If all checks are successful, the processing continues to the next step. If any of the checks fails, the UE 10 should establish application layer security with the MTC Server/Application 20/30.

It is to be noted that checking of all lists may not be needed every time data is sent. Instead, the determination as to whether application layer security is needed could be cached and it could be associated to a data session, e.g. an RTP session.

In step 4 of FIG. 12, the UE 10 may establish an application layer session (which may include application layer authentication) and starts to send data to the MTC Server/Application 20/30 without applying any application layer (end to end) security to the data.

In step 5 of FIG. 12, the data is forwarded within the 3GPP network.

In step 6 of FIG. 12, the MTC Server/Application 20/30 receives the data. The MTC Server/Application 20/30 determines if application layer security is needed. In doing so, the MTC Server/Application 20/30 checks under which PLMN the UE 10 is (this information can be received, e.g. from the 3GPP network). The MTC Server/Application 20/30 also checks if the relevant PLMN-ID is found in List 1 (this information can be received e.g. from the 3GPP network, which can have an up-to-date status of the security of path A for this UE 10). In case of roaming, the MTC Server/Application 20/30 checks if the relevant PLMN-ID is found in List 3, and if the relevant PLMN-ID<>FQDN pair is found in List 2.

If all checks are successful, the MTC Server/Application 20/30 accepts the data. If any of the checks fails, the MTC Server/Application 20/30 does not accept the data and establishes application layer security with the UE 10.

It is to be noted that a thorough checking of the lists may not be needed every time data is received, but the determination as to whether application layer security is needed could be cached and it could be associated to a data session, e.g. an RTP session.

If the UE 10 requests to establish application layer security, the MTC Server/Application 20/30 would accept the request even if List 1 indicates that the PLMN is trustworthy.

Referring now to the third phase mentioned above, when the MTC Server/Application 20/30 wishes to send data to the UE 10, a precondition is that that the UE 10 has been triggered (see FIG. 11) or that the UE 10 has autonomously contacted the MTC Server/Application 20/30 (see FIG. 12). Data can be sent securely without needing to set up application layer security since the MTC Server/Application 20/30 can trust the path to the UE 10 to be secured by the lower layers.

Figure 13:
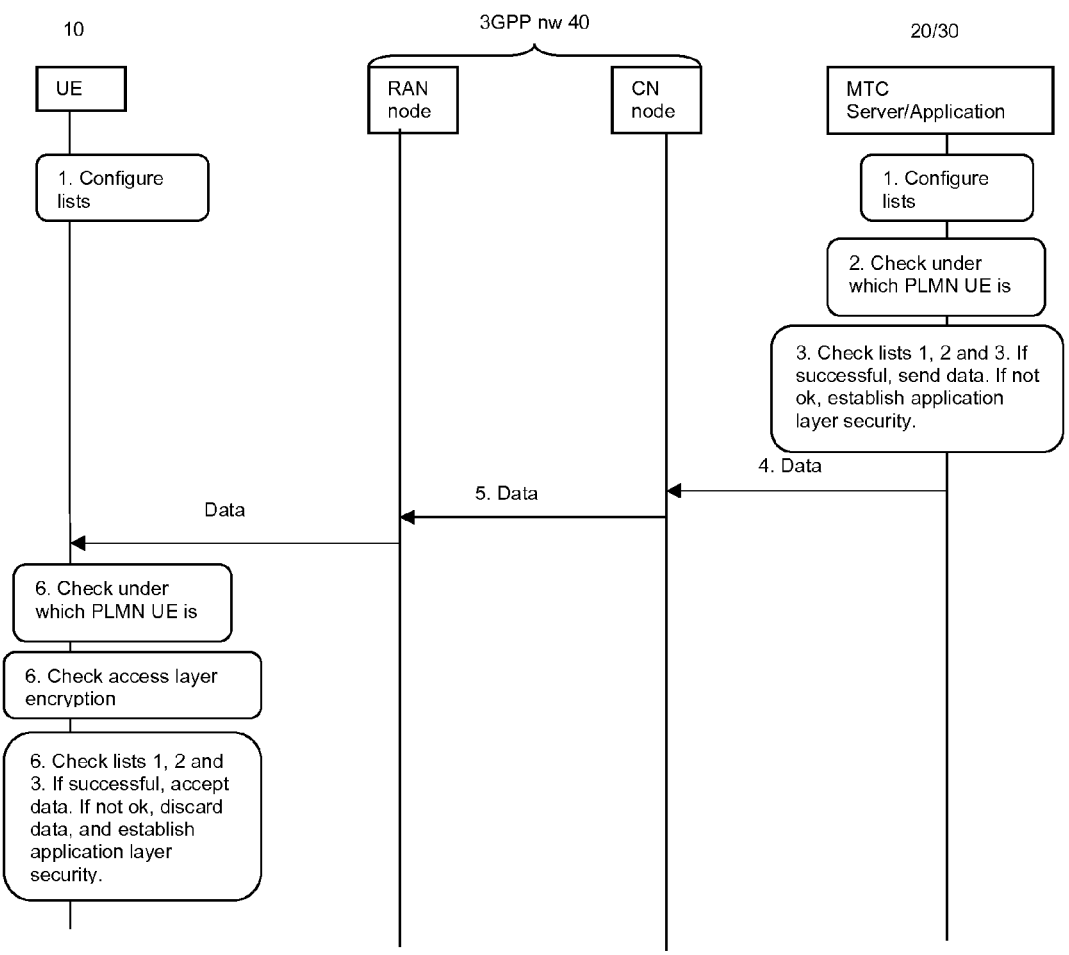
FIG. 13 illustrates, in the second embodiment of the present invention, the sending of data from the MTC Server/Application to the UE.

FIG. 13 illustrates the sending of data from the MTC Server/Application 20/30 to the UE 10 in the third phase.

In step 1 of FIG. 13, the UE 10 and MTC Server/Application 20/30 are configured with (receive) Lists 1, 2 and 3. The MTC Server/Application 20/30 is identified with a FQDN. The configuration can be done by an entity in the UE 10's home PLMN or a third party.

In step 2 of FIG. 13, the MTC Server/Application 20/30 wishes to send data to the UE 10. The MTC Server/Application 20/30 checks under which PLMN the UE 10 is.

In step 3 of FIG. 13, the MTC Server/Application 20/30 determines if application layer security is needed. In doing so, the MTC Server/Application 20/30 checks if the relevant PLMN-ID is found in List 1 and if the relevant PLMN-ID is found in List 3 and if the relevant PLMN-ID<>FQDN pair is found in List 2. If all checks are successful, the processing continues in the next step. If any of the checks fails, the MTC Server/Application 20/30 should establish application layer security with the UE 10.

In step 4 of FIG. 13, the MTC Server/Application 20/30 establishes a connection and starts to send data to the UE 10 without applying any end-to-end security. This means that the MTC Server/Application 20/30 can rely on the 3GPP network to securely forward the data to the UE 10.

It is to be noted that a thorough checking of the lists may not be needed every time data is sent, but the determination as to whether application layer security is required could be cached and it could be associated to a data session, e.g. an RTP session.

In step 5 of FIG. 13, the data is forwarded within the 3GPP network.

In step 6 of FIG. 13, the UE 10 receives the data. The UE 10 determines if application layer security is needed. In doing so, the UE 10 checks if encryption is enabled at the access layer, and if the relevant PLMN-ID is trustworthy, i.e. it is found in List 1. The UE 10 checks if a secure path is set up between the PLMN and MTC Server/Application 20/30, i.e. if the relevant PLMN-ID<>FQDN pair is found in List 2. The UE 10 checks if the relevant PLMN-ID is found in List 3. If all checks are successful, the UE 10 accepts the data. If any of the checks fails, the UE 10 does not accept the data and establishes application layer security with the MTC Server/Application 20/30.

It is to be noted that a thorough checking of both lists may not be needed every time data is received. Instead, the determination as to whether application layer security is needed could be cached and it could be associated to a data session, e.g. an RTP session.

Configuration and management of the Lists 1, 2 and 3 in the UE 10 will now be described with reference to FIGS. 10 to 12. These Lists are also referred to above as relevant data, and below as Configuration Data.

The Configuration Data could be stored either on the Subscriber Identity Module, which for example can be a Universal Subscriber Identity Module (USIM), or on the ME part of the device (i.e. that part of the device not including the USIM). Wherever USIM or IP Multimedia Services Identity Module (ISIM) is mentioned herein, other alternative Subscriber Identity Modules may be applicable. If the Configuration Data is stored on a Subscriber Identity Module, then it is envisioned that this data may be stored on the Subscriber Identity Module from the start. If the Configuration Data is stored in the ME, then the Configuration Data typically needs to be updated remotely by the network.

At some point, the need arises to be able to update and manage the Lists in the UE 10, remotely from the network. This could be due to e.g. a different M2M application being taken into use by the device, a switch of subscription to a different operator, operator enabling/disabling access layer security or operator enabling/disabling external interface security, new PLMN-IDs need to be added or deleted, and so on.

There are several options available for managing and updating the Lists in the UE 10 by the network, and these will now be described in turn.

Figure 14:
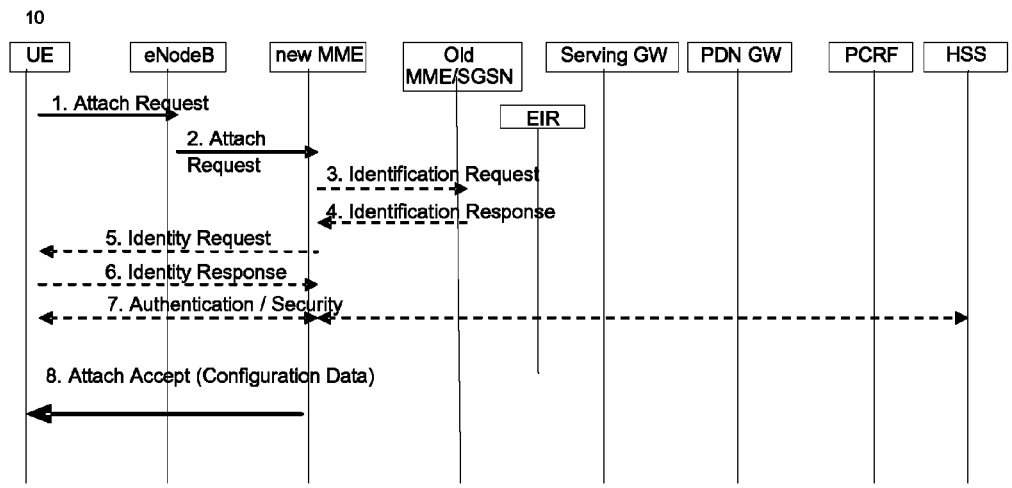
FIG. 14 illustrates, in the second embodiment of the present invention, an example signalling flow for delivery of relevant data to the UE by the core network.

FIG. 14 illustrates an example in which Configuration Data is delivered by Core Network MME/MSC/SGSN. The Configuration Data could be delivered to the UE 10 by the core network (MME, MSC or SGSN) in Non Access Stratum (NAS) protocols. A new optional information element (IE) could be added to any NAS procedure in the NAS protocol from the network to UE 10 direction (e.g. Attach Accept, Routing Area Update Accept, Location Update Accept, Tracking Area Update Accept, Security Mode Command etc.). In the example shown in FIG. 14, in step 1 an Attach Request is send from the UE 10 to an eNodeB. In step 2, the Attach Request is forwarded from the eNodeB to the new MME, which then sends in step 3 an Identification Request to the old MME (or SGSN); the old MME (or SGSN) responds to the new MME with an Identification Response in step 4. The new MME sends an Identity Request to the UE 10 in step 5, and the UE 10 responds to the new MME with an Identity Response in step 6. Authentication is performed between the UE 10 and the HSS in step 7, and in step 8 the new MME sends an Attach Accept to the UE 10, including the Configuration Data. It would also be possible to deliver the Configuration Data to roaming users.

In another example, Configuration Data is delivered by the Radio Access Layer (e.g. a Radio Resource Control or RRC layer in the eNB). Such an example may be based around the RRC layer at RRC connection establishment, where either the RRC layer in eNodeB includes the Configuration Data of the selected MME node to the UE 10 in the RRCConnectionSetup message, or the RRC layer includes new Configuration Data in some other message, from the network to the UE 10. It would also be possible to deliver the Configuration Data to roaming users.

In another example, Configuration Data is delivered by an Access Network Discovery and Selection Function (ANDSF). The UE 10 may initiate communication (IP-tunnel) with the ANDSF server for operator preferred access network discovery. After communicating with the ANDSF server, the UE 10 may be provided with updated inter-system policy and information about available access networks in the vicinity of the UE 10. Configuration Data, as described herein, could be provided as well by the ANDSF server to the UE 10. Even when the UE 10 is roaming in a visited PLMN, the UE 10 may use DNS lookup to discover the IP address of V-ANDSF and in order to access the ANDSF in a visited PLMN.

Figure 15:
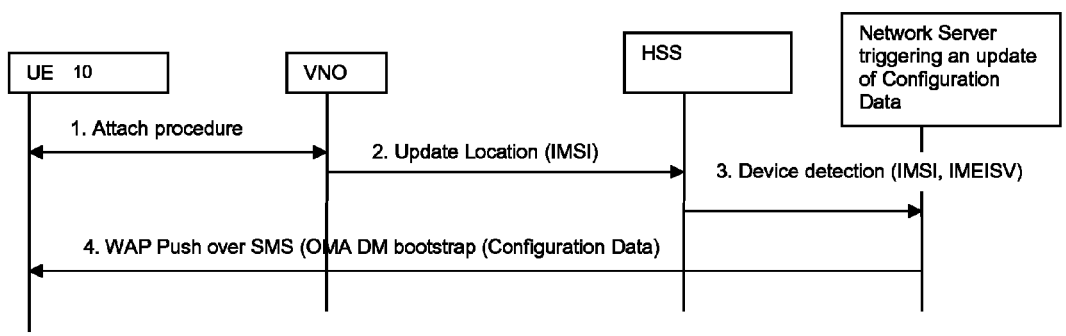
FIG. 15 illustrates, in the second embodiment of the present invention, an example signalling flow for delivery of relevant data to the UE by a push method.

FIG. 15 illustrates an example in which Configuration Data is delivered by a push method. When the UE 10 contacts the network with e.g. an Attach procedure/Location Update/Routing Area Update procedure/Tracking Area Update procedure, the HLR/HSS could trigger a network server (which is either managing the update of the Configuration Data itself or connected to the network server providing the Configuration Data) to send the Configuration Data to the UE 10 in an OMA DM bootstrap message in a WAP Push message using SMS. Even GBA Push would be even more secure to use in the push method. In the example shown in FIG. 15, in step 1 an attach procedure is performed between the UE 10 and a Virtual Network Operator (VNO). In step 2, an Update Location (IMSI) message is sent from the VNO to the HSS. In step 3, a Device Detection (IMSI, IMEISV) message is sent from the HSS to the network server, which triggers the server to send a WAP push message (over SMS) to the UE 10, with the push message containing the Configuration Data. It would also be possible to deliver the Configuration Data to roaming users.

In another example, Configuration Data is delivered by OMA DM server. One option would be to allow the OMA DM server to configure the Configuration Data in the UE 10, either in ME or on a Subscriber Identity Module such as a USIM.

Figure 16:
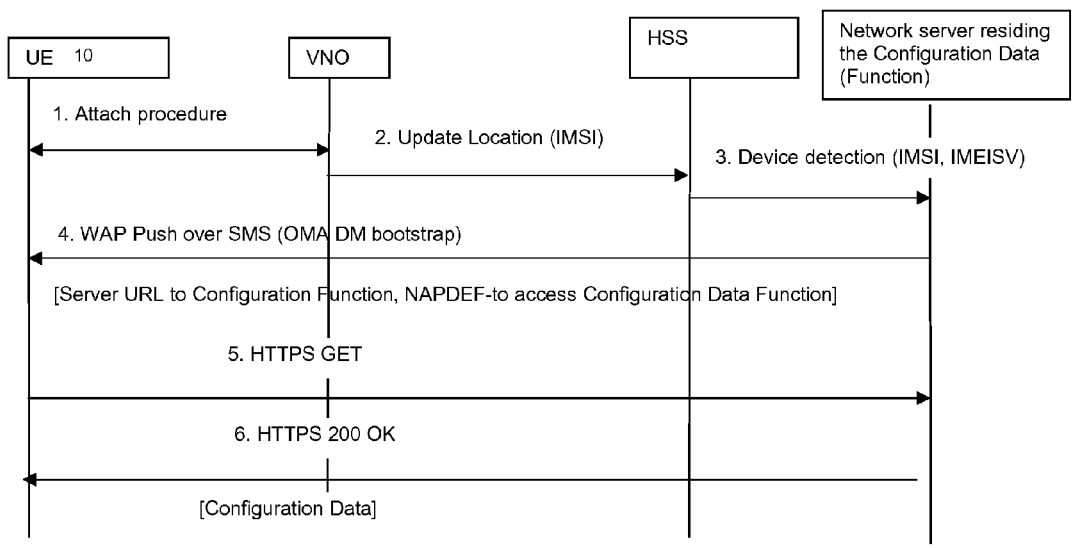
FIG. 16 illustrates, in the second embodiment of the present invention, an example signalling flow for delivery of relevant data to the UE by a pull method.

FIG. 16 illustrates an example in which Configuration Data is delivered by a pull method. Such an approach may involve triggering the UE 10 to contact the network server residing the Configuration Data Function via IP connectivity and retrieving the Configuration Data from the Configuration Function over a secured HTTPS link.

When the UE 10 contacts the network with e.g. an Attach procedure/Location Update/Routing Area Update procedure/Tracking Area Update procedure, the HLR/HSS could trigger the Configuration Function to send a trigger message to the UE 10 in an OMA DM bootstrap message in a WAP Push message using SMS. Even GBA Push could be used. This trigger would command the UE 10 to connect to the network server residing the Configuration Data Function in order to pull or retrieve Configuration Data from the network server residing the Configuration data.

Steps 1 to 4 of FIG. 16 are analogous to the correspondingly-numbered steps in FIG. 15, except the push message sent in step 4 of FIG. 16 does not actually contain the Configuration Data, but instead contains a trigger for triggering the UE 10 to fetch the Configuration Data. Having received the trigger message, the UE 10 fetches the Configuration Data in steps 5 and 6 of FIG. 16, sending a HTTPS GET message to the network server in step 5, to which the network server responds with a HTTPS 200 OK message containing the Configuration Data.

The UE 10 could also be preconfigured by the home operator with the IP address of the network server residing the Configuration Data.

In another example, Configuration Data is delivered to a Subscriber Identity Module on a physical UICC. With such an approach, the Configuration Data can be delivered to the Subscriber Identity Module, for example a USIM or ISIM or any other SIM application held by a physical UICC card, using e.g. the OTA protocol from the OTA system.

In another example, Configuration can be by way of the MTC Server/Application 20/30. With such an approach, the initial contact with the MTC Server/Application 20/30 could include provisioning of the Configuration Data. Initial communication would then have to be secured by application layer security, but subsequent communication could then rely on access layer security.

In another example, Configuration Data is delivered to any 'downloadable USIM' (e.g. any solution which is downloaded remotely by the network e.g. eUICC in ETSI SCP or Remote Subscription Management in 3GPP2 or MCIM in 3GPP) via the ME part of the device. Here, using e.g. 'Downloadable USIM' is meant to include any downloadable Subscriber Identity Module. This could make use of the OTA protocol, if the subscription is hold on a physical integrated (e.g. UICC) card into the MTC device; or the OMA DM protocol, if the subscription (Subscriber Identity Module/SIM application) is implemented/supported in a trusted execution environment in the ME part of the MTC device.

Modifications and other embodiments of the disclosed solutions will come to mind to one skilled in the art having the benefit of the teachings presented in the foregoing descriptions and the associated drawings. Therefore, it is to be understood that the solutions are not to be limited to the specific embodiments disclosed and that modifications and other embodiments are intended to be included within the scope of this disclosure. Although specific terms may be employed herein, they are used in a generic and descriptive sense only and not for purposes of limitation.

Figure 17:
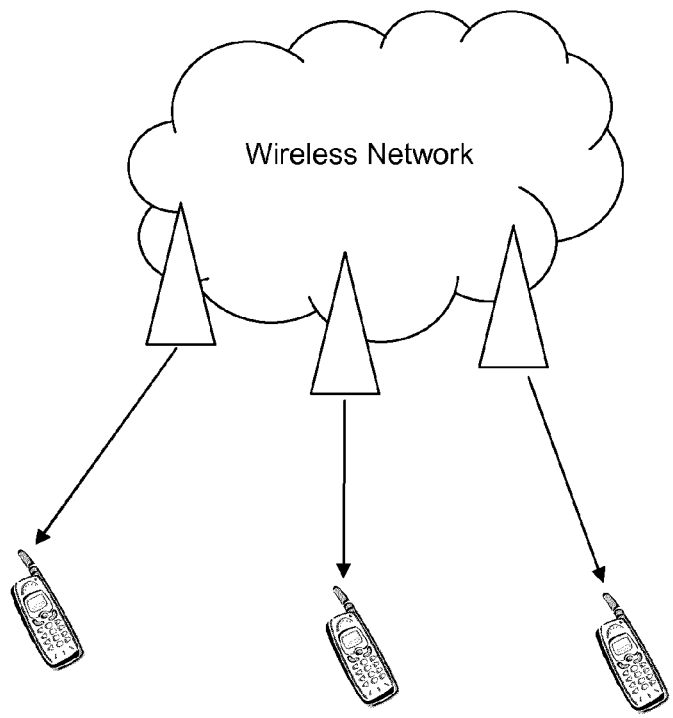
FIG. 17 illustrates schematically a network in which an embodiment of the present invention can be implemented.

Although the described solutions may be implemented in any appropriate type of telecommunication system supporting any suitable communication standards and using any suitable components, particular embodiments of the described solutions may be implemented in a network, such as that illustrated in FIG. 17.

As shown in FIG. 17, the example network may include one or more instances of user equipment (UEs) and one or more base stations capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as the example UE illustrated in greater detail by FIG. 18. Similarly, although the illustrated base stations may represent network nodes that include any suitable combination of hardware and/or software, these base stations may, in particular embodiments, represent devices such as the example base station illustrated in greater detail by FIG. 19.

Figure 18:
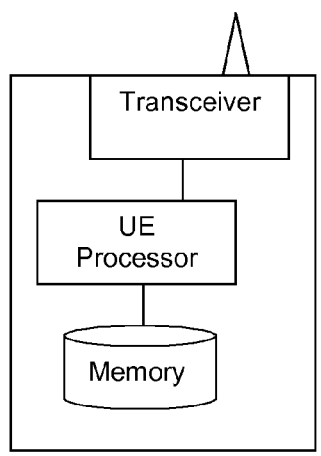
FIG. 18 illustrates schematically a user terminal according to an embodiment of the present invention.

As shown in FIG. 18, the example UE includes a processor, a memory, a transceiver, and an antenna. In particular embodiments, some or all of the functionality described above as being provided by mobile communication devices or other forms of UE may be provided by the UE processor executing instructions stored on a computer-readable medium, such as the memory shown in FIG. 18. Alternative embodiments of the UE may include additional components beyond those shown in FIG. 18 that may be responsible for providing certain aspects of the UE's functionality, including any of the functionality described above and/or any functionality necessary to support the solution described above.

Figure 19:
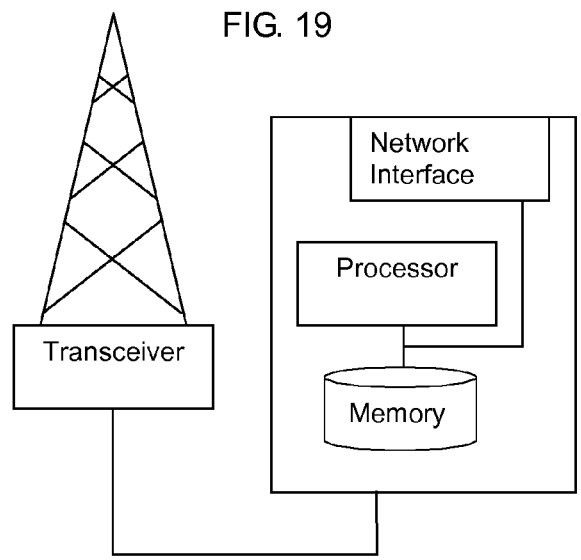
FIG. 19 illustrates schematically a base station according to an embodiment of the present invention.

As shown in FIG. 19, the example base station includes a processor, a memory, a transceiver, and an antenna. In particular embodiments, some or all of the functionality described above as being provided by a mobile base station, a base station controller, a node B, an enhanced node B, and/or any other type of mobile communications node may be provided by the base station processor executing instructions stored on a computer-readable medium, such as the memory shown in FIG. 19. Alternative embodiments of the base station may include additional components responsible for providing additional functionality, including any of the functionality identified above and/or any functionality necessary to support the solution described above.

It will be appreciated that, since the access security could (in principle) be switched on/off dynamically it could be that access security is sufficient initially, but then (for some reason) switched off. Therefore an option could be that one initially sets up the necessary keys for "e2e" (end-to-end) security but do not take them into use until the UE/MTC server becomes aware that hop-by-hop security on lower layers has "disappeared" at a later time. The UE and MTC server could detect this, e.g. by communicating between themselves, or some other node could communicate the change of security e.g. by configuring to one or both nodes, or the 3GPP network could indicate this to one or both nodes.

Embodiments have been described herein involving a UE, 3GPP network and MTC server/Application. More specifically, the nodes assigned for 3GPP network could include in the RAN side, e.g. GERAN nodes like BTS, BSC, UTRAN nodes like RNC and NodeB, or E-UTRAN nodes like eNodeB, or some other nodes. On the Core Network side e.g. MME, SGSN, HSS, GGSN, P-GW could be involved. The role of UE could be taken by any mobile terminal including e.g. an MTC device or e.g. an MTC GW relying traffic between the mobile network and sensors in a local network.

However, it will be appreciated that the invention is not applicable only to mobile networks. It can also be applied e.g. to fixed networks such as BBF Broadband Forum networks as well as other types of mobile networks such as 3GPP2 networks. Additionally, the invention is not specific to M2M applications, but can be applied to any other kind of communication type such as voice traffic, and/or IP communication.

The appended signalling diagrams can be considered not only to depict a series of messages exchanged and method steps performed by the various nodes, but also to depict apparatus for exchanging those messages or performing those method steps. In addition, for the sake of completeness, any message which is shown or described as being sent from node A to node B implicitly includes the step of node A sending the message as well as the step of node B receiving the message, and means at nodes A and B for performing those steps.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Likewise, an embodiment of the present invention is not restricted to a non-3GPP access network such as the BBF, but is applicable to any non-3GPP access network. Therefore, in particular, the terms 3GPP and BBF and associated or related terms used in the above description and in the appended drawings and any appended claims now or in the future are to be interpreted accordingly.

For additional information, either as background or for more detailed disclosure of specific elements of embodiments of the present invention, the following documents may be of relevance;

TR23.888 (http://www.3gpp.org/ftp/Specs/html-info/23888.htm)
TR 33.868 (http://www.3gpp.org/ftp/Specs/html-info/33868.htm)
TR 33.402 (http://www.3gpp.org/ftp/Specs/html-info/33402.htm)
TR 24.312 (http://www.3gpp.org/ftp/Specs/html-info/24312.htm)

The invention claimed is:

1. A method of securing data communications between a first node attached to a first network and a second node attached to a second network, comprising at the second node:
   receiving first information on whether the first network has a secure network layer path to the first node or is known to use a secure network layer path to attached nodes;
   receiving second information on whether the second node has a secure network layer path to the second network or is known to use a secure network layer path to the second network;
   receiving third information on whether the first network has a secure internal network layer path and, where the first and second networks are different, on whether the first network has a secure network layer path to the second network or is known to use a secure network layer path to the second network;
   receiving data from the first node without application layer security, or preparing data to be sent to the first node;
   determining from the first, second and third information whether the entire path between the first node and the second node is secured at the network layer level,
   and when the determination is that the entire path between the first node and the second node is not secured at the network layer level, then:
      in a case of having prepared data to be sent to the first node, establishing application layer security with the first node, and sending the prepared data to the first node using the established application layer security; and
      in a case of having received data from the first node without application layer security, discarding the received data, establishing application layer security with the first node, and receiving re-sent data by the first node using the established application layer security,
   and when the determination is that the entire path between the first node and the second node is secured at the network layer level, then:
      in a case of having prepared data to be sent to the first node, sending the prepared data to the first node without application layer security; and
      in a case of having received data from the first node without application layer security, accepting the received data.

2. A method of securing data communications between a first node attached to a first network and a second node attached to a second network, comprising at the first node:

either receiving first, second and third information or receiving an indication from the second node derived from such information, wherein: the first information comprises information on whether the first network has a secure network layer path to the first node or is known to use a secure network layer path to attached nodes; the second information comprises information on whether the second node has a secure network layer path to the second network or is known to use a secure network layer path to the second network; and the third information comprises information on whether the first network has a secure internal network layer path and, where the first and second networks are different, on whether the first network has a secure network layer path to the second network or is known to use a secure network layer path to the second network;

receiving data from the second node without application layer security, or preparing data to be sent to the second node;

determining from the received first, second and third information or from the received indication whether the entire path between the first node and the second node is secured at the network layer level, and when the determination is that the entire path between the first node and the second node is not secured at the network layer level, then:
- in a case of having prepared data to be sent to the second node, establishing application layer security with the second node, and sending the prepared data to the second node using the established application layer security; and
- in a case of having received data from the second node without application layer security, discarding the received data, establishing application layer security with the second node, and receiving re-sent data by the second node using the established application layer security, and when the determination is that the entire path between the first node and the second node is secured at the network layer level, then:
- in a case of having prepared data to be sent to the second node, sending the prepared data to the second node without application layer security; and
- in a case of having received data from the second node without application layer security, accepting the received data.

3. The method as claimed in claim 2, comprising receiving the determination or the first, second and third information from the second node during a registration or re-registration of the first node with the second node.

4. The method as claimed in claim 1, wherein at least the determining is performed at registration or re-registration of the first node with the second node.

5. The method as claimed in claim 4, comprising receiving the first information from the other node during the registration or re-registration.

6. The method as claimed in claim 5, wherein the first information is information on whether the first network has a secure network layer path to the first node.

7. The method as claimed in claim 1, comprising caching the result of the determining, and using the cached result when sending or receiving additional data to/from the other node.

8. The method as claimed in claim 1, comprising performing the determining for each set or batch of data to be sent to or received from the other node.

9. The method as claimed in claim 1, wherein the data being sent to or received at the first node comprises a trigger indication for triggering the first node to establish data communication with the second node.

10. The method as claimed in claim 1, wherein the first information comprises a list of networks each of which networks is known to use a secure network layer path to attached nodes, and wherein the determining comprises determining whether the first network has a secure network layer path to the first node by determining whether the first network is in the list of the first information.

11. The method as claimed in claim 1, wherein the second information comprises a list of nodes each of which nodes is known to use a secure network layer path to the second network, and wherein the determining comprises determining whether the second node has a secure network layer path to the second network by determining whether the second node is in the list of the second information.

12. The method as claimed in claim 1, wherein the third information comprises a list of networks each of which networks is known to have a secure internal network layer path and each of which networks is, where different to the second network, known to have a secure network layer path to the second network, and wherein the determining comprises determining whether the first network has a secure internal network layer path and, where the first and second networks are different, whether the first network has a secure network layer path to the second network by determining whether the first network is in the list of the third information.

13. The method as claimed in claim 1, wherein the second network is the same as the first network.

14. The method as claimed in claim 1, wherein the third information comprises an assumption that the first network has a secure internal network layer path, at least where the second network is the same as the first network.

15. The method as claimed claim 1, wherein the second network is assumed to have a secure internal network layer path and wherein the determining comprises determining whether the second network has a secure internal network layer path.

16. The method as claimed in claim 1, wherein the first, second and third information are received by a configuration procedure.

17. The method as claimed in claim 16, wherein the configuration procedure at the first node comprises receiving the first, second and third information at the first node from a core part of the second network in a Non Access Stratum related message, such as an Attach Accept message, a Routing Area Update Accept message, a Location Update Accept message, a Tracking Area Update Accept message, or a Security Mode Command message.

18. The method as claimed in claim 16, wherein the configuration procedure at the first node comprises the first node triggering a network server in the second network to send the first, second and third information, the triggering being performed as part of an attach or location update or routing area update or tracking area update or similar procedure, and receiving the first, second and third information from the network server in a push message.

19. The method as claimed in claim 16, wherein the configuration procedure at the first node comprises the first node receiving a trigger message from a network server in the second network for retrieving the first, second and third information, the trigger message being received following or as part of an attach or location update or routing area update or tracking area update or similar procedure, and retrieving or pulling the first, second and third information from the network server in response to receipt of the trigger message.

20. The method as claimed in claim 16, wherein the configuration procedure at the first node comprises receiving the first, second and third information over a radio access layer at establishment of a connection to a radio access part of the first network.

21. The method as claimed in claim 16, wherein the configuration procedure at the first node comprises receiving the first, second and third information from an access network discovery and selection function, or from an Open Mobile Alliance device management server, or from the second node.

22. The method as claimed in claim 16, wherein the configuration procedure at the first node comprises physically loading a subscriber identity module containing the first, second and third information into the first node, or receiving a downloadable subscriber identity module from the first or second network.

23. The method as claimed in claim 1, wherein one or both of the first and second networks is/are a mobile communications network, a wireless network or a wireline network.

24. The method as claimed in claim 23, wherein the second network is a registered or home network of the first node.

25. The method as claimed in claim 23, wherein, in a roaming scenario in which the first node is mobile and attaches to different first networks as it roams, the first network is a visited network.

26. The method as claimed in claim 1, wherein the first and second networks are 3GPP networks.

27. The method as claimed in claim 1, wherein the first node is a User Equipment and the second node is a server; the first node is a server and the second node is a User Equipment; the first and second nodes are User Equipments; or the first and second nodes are servers.

28. The method as claimed in claim 1, wherein the second node is or comprises a Machine Type Communication Server or Application, and/or wherein the first node comprises a Machine Type Communication Application, and wherein the data is machine type data.

29. An apparatus for use in a method of securing data communications between a first node attached to a first network and a second node attached to a second network, comprising at the second node a receiver, a controller and a transmitter, wherein:
  the receiver is arranged to receive first information on whether the first network has a secure network layer path to the first node or is known to use a secure network layer path to attached nodes;
  the receiver is arranged to receive second information on whether the second node has a secure network layer path to the second network or is known to use a secure network layer path to the second network;
  the receiver is arranged to receive third information on whether the first network has a secure internal network layer path and, where the first and second networks are different, on whether the first network has a secure network layer path to the second network or is known to use a secure network layer path to the second network;
  the receiver is arranged to receive data from the first node without application layer security, or the controller is arranged to prepare data to be sent to the first node;
  the controller is arranged to determine from the first, second and third information whether the entire path between the first node and the second node is secured at the network layer level,
  and when the determination is that the entire path between the first node and the second node is not secured at the network layer level, then:
    in a case of having prepared data to be sent to the first node, the controller is arranged to establish application layer security with the first node, and the transmitter is arranged to send the prepared data to the first node using the established application layer security; and
    in a case of having received data from the first node without application layer security, the controller is arranged to discard the received data, to establish application layer security with the first node, and receive re-sent data by the first node using the established application layer security,
  and when the determination is that the entire path between the first node and the second node is secured at the network layer level, then:
    in a case of having prepared data to be sent to the first node, the transmitter is arranged to send the prepared data to the first node without application layer security; and
    in a case of having received data from the first node without application layer security, the controller is arranged to accept the received data.

30. An apparatus for use in a method of securing data communications between a first node attached to a first network and a second node attached to a second network, comprising at the first node a receiver, a controller and a transmitter, wherein:
  the receiver is arranged to receive first, second and third information or to receive an indication from the second node derived from such information, wherein: the first information comprises information on whether the first network has a secure network layer path to the first node or is known to use a secure network layer path to attached nodes; the second information comprises information on whether the second node has a secure network layer path to the second network or is known to use a secure network layer path to the second network; and the third information comprises information on whether the first network has a secure internal network layer path and, where the first and second networks are different, on whether the first network has a secure network layer path to the second network or is known to use a secure network layer path to the second network;
  the receiver is arranged to receive data from the second node without application layer security, or the controller is arranged to prepare data to be sent to the second node;
  the controller is arranged to determine from the received first, second and third information or from the received indication whether the entire path between the first node and the second node is secured at the network layer level,
  and when the determination is that the entire path between the first node and the second node is not secured at the network layer level, then:
    in a case of having prepared data to be sent to the second node, the controller is arranged to establish application layer security with the second node, and the transmitter is arranged to send the prepared data to the second node using the established application layer security; and
    in a case of having received data from the second node without application layer security, the controller is arranged to discard the received data, to establish application layer security with the second node, and to receive re-sent data by the second node using the established application layer security, and when the determination is that the entire path between the first node and the second node is secured at the network layer level, then:

in a case of having prepared data to be sent to the second node, the transmitter is arranged to send the prepared data to the second node without application layer security; and in a case of having received data from the second node without application layer security, the controller is arranged to accept the received data.

31. The apparatus as claimed in claim 29, wherein the controller is arranged to cache the determination, and to use the cached result when sending or receiving additional data to/from the other node.

32. The apparatus as claimed in claim 29, wherein the controller is arranged to perform the determining for each set or batch of data to be sent to or received from the other node.

33. The apparatus as claimed in claim 29, wherein the first information comprises a list of networks each of which networks is known to use a secure network layer path to attached nodes, and wherein the controller is arranged, as part of its determination, to determine whether the first network has a secure network layer path to the first node by determining whether the first network is in the list.

34. The apparatus as claimed in claim 29, wherein the second information comprises a list of nodes each of which nodes is known to use a secure network layer path to the second network, and wherein the controller is arranged, as part of its determination, to determine whether the second node has a secure network layer path to the second network by determining whether the second node is in the list.

35. The apparatus as claimed in claim 29, wherein the third information comprises a list of networks each of which networks is known to have a secure internal network layer path and each of which networks is, where different to the second network, known to have a secure network layer path to the second network, and wherein the controller is arranged, as part of its determination, to determine whether the first network has a secure internal network layer path and, where the first and second networks are different, whether the first network has a secure network layer path to the second network by determining whether the first network is in the list.

36. The method as claimed in claim 1, wherein the receiver is arranged to receive the first, second and third information by a configuration procedure.

37. The apparatus as claimed in claim 36, wherein, as part of the configuration procedure at the first node, the receiver is arranged to receive the first, second and third information at the first node from a core part of the second network in a Non Access Stratum related message, such as an Attach Accept message, a Routing Area Update Accept message, a Location Update Accept message, a Tracking Area Update Accept message, or a Security Mode Command message.

38. The apparatus as claimed in claim 36, wherein, as part of the configuration procedure at the first node, the controller is arranged to trigger a network server in the second network to send the first, second and third information, the triggering being performed as part of an attach or location update or routing area update or tracking area update or similar procedure, and wherein the receiver is arranged to receive the first, second and third information from the network server in a push message.

39. The apparatus as claimed in claim 36, wherein, as part of the configuration procedure at the first node, the receiver is arranged to receive a trigger message from a network server in the second network for retrieving the first, second and third information, the trigger message being received following or as part of an attach or location update or routing area update or tracking area update or similar procedure, and wherein the controller is arranged to retrieve or pull the first, second and third information from the network server in response to receipt of the trigger message.

40. The apparatus as claimed in claim 36, wherein, as part of the configuration procedure at the first node, the receiver is arranged to receive the first, second and third information over a radio access layer at establishment of a connection to a radio access part of the first network.

41. The apparatus as claimed in claim 36, wherein, as part of the configuration procedure at the first node, the receiver is arranged physically to receive a subscriber identity module containing the first, second and third information, or to receive a downloadable subscriber identity module from the first or second network.

42. The apparatus as claimed in claim 29, wherein one or both of the first and second networks is/are a mobile communications network, a wireless network or a wireline network.

43. The apparatus as claimed in claim 29, the apparatus comprising a communications node.

44. A computer program product comprising a non-transitory computer readable storage medium comprising program code configured to secure data communications between a first node attached to a first network and a second node attached to a second network, which, when the computer program product is executed on an apparatus, causes the apparatus to perform operations at the second node comprising:

receiving first information on whether the first network has a secure network layer path to the first node or is known to use a secure network layer path to attached nodes;

receiving second information on whether the second node has a secure network layer path to the second network or is known to use a secure network layer path to the second network;

receiving third information on whether the first network has a secure internal network layer path and, where the first and second networks are different, on whether the first network has a secure network layer path to the second network or is known to use a secure network layer path to the second network;

receiving data from the first node without application layer security, or preparing data to be sent to the first node;

determining from the first, second and third information whether the entire path between the first node and the second node is secured at the network layer level, and when the determination is that the entire path between the first node and the second node is not secured at the network layer level, then:

in a case of having prepared data to be sent to the first node, establishing application layer security with the first node, and sending the prepared data to the first node using the established application layer security; and in a case of having received data from the first node without application layer security, discarding the received data, establishing application layer security with the first node, and receiving re-sent data by the first node using the established application layer security, and when the determination is that the entire path between the first node and the second node is secured at the network layer level, then:

in a case of having prepared data to be sent to the first node, sending the prepared data to the first node without application layer security; and in a case of having received data from the first node without application layer security, accepting the received data.

* * * * *